(12) United States Patent
Turpin et al.

(10) Patent No.: US 8,769,940 B2
(45) Date of Patent: Jul. 8, 2014

(54) MARINE EXHAUST CATALYST

(75) Inventors: Mark E. Turpin, Maple Grove, MN (US); Clayton Smith, Greenfield, MN (US); Gary A. Salmonson, Saint Cloud, MN (US); Brian G. Haupt, Stillwater, MN (US); Shawn John Kipka, Saint Francis, MN (US); Kurt Butz, Edina, MN (US); Lee Severtson, Ham Lake, MN (US)

(73) Assignee: Cummins Power Generation IP, Inc., Minneapolis, MN (US)

( * ) Notice: Subject to any disclaimer, the term of this patent is extended or adjusted under 35 U.S.C. 154(b) by 176 days.

(21) Appl. No.: 13/101,963

(22) Filed: May 5, 2011

(65) Prior Publication Data

US 2012/0060473 A1 Mar. 15, 2012

Related U.S. Application Data

(60) Provisional application No. 61/343,883, filed on May 5, 2010.

(51) Int. Cl.
F01N 3/00 (2006.01)

(52) U.S. Cl.
USPC .......... 60/298; 60/274; 60/299; 60/320; 60/321; 422/169; 422/170; 422/173; 440/88 J; 440/89 R; 440/89 B

(58) Field of Classification Search
USPC .......... 60/274, 284, 298, 299, 300, 320, 321; 422/167, 169, 170, 173; 440/88 G, 88 J, 440/89 R, 89 B, 89 C
See application file for complete search history.

(56) References Cited

U.S. PATENT DOCUMENTS

| | | |
|---|---|---|
| 2,911,094 A | 11/1959 | Nagel |
| 3,967,941 A | 7/1976 | Terao |
| 4,019,456 A | 4/1977 | Harbert |
| D244,385 S | 5/1977 | McCord |
| 4,032,009 A | 6/1977 | Taylor |
| 4,068,612 A | 1/1978 | Meiners |
| 4,091,616 A | 5/1978 | Loweg |
| D249,788 S | 10/1978 | Nanjo |
| 4,120,376 A | 10/1978 | Palmer |
| 4,144,932 A | 3/1979 | Voigt |
| 4,174,036 A | 11/1979 | Beckman et al. |
| 4,214,443 A | 7/1980 | Herenius |

(Continued)

FOREIGN PATENT DOCUMENTS

| | | |
|---|---|---|
| DE | 4224853 | 2/1994 |
| WO | WO 2005/098303 | 10/2005 |
| WO | WO 2010/060481 | 6/2010 |
| WO | WO 2010/060482 | 6/2010 |

OTHER PUBLICATIONS

U.S. Appl. No. 13/101,976, filed May 5, 2011, Turpin et al.

(Continued)

Primary Examiner — Binh Q Tran
(74) Attorney, Agent, or Firm — Foley & Lardner LLP

(57) ABSTRACT

An internal combustion engine is coupled to an electric power generator. An exhaust manifold for the engine includes an exhaust gas conduit. A housing includes a catalyst in fluid communication with the conduit to receive exhaust produced by the engine. The catalyst is operable to reduce one or more constituents of the exhaust.

24 Claims, 23 Drawing Sheets

(56) References Cited

U.S. PATENT DOCUMENTS

| | | | |
|---|---|---|---|
| 4,463,709 A | 8/1984 | Pluequet | |
| 4,497,630 A | 2/1985 | Oliver | |
| 4,573,318 A | 3/1986 | Entringer et al. | |
| 4,733,750 A | 3/1988 | Poirier et al. | |
| 4,836,123 A | 6/1989 | Grinde et al. | |
| D303,785 S | 10/1989 | Waltz et al. | |
| 4,871,922 A | 10/1989 | Heinrich et al. | |
| 4,900,282 A | 2/1990 | Takahashi et al. | |
| D308,206 S | 5/1990 | Kelly et al. | |
| D309,288 S | 7/1990 | Haverly | |
| D309,597 S | 7/1990 | Higuchi et al. | |
| D309,606 S | 7/1990 | Kelly et al. | |
| 4,991,546 A | 2/1991 | Yoshimura | |
| 5,014,660 A | 5/1991 | Westerbeke, Jr. | |
| 5,032,748 A | 7/1991 | Sakuraba et al. | |
| 5,125,378 A | 6/1992 | Westerbeke, Jr. | |
| 5,234,363 A | 8/1993 | Motose | |
| 5,272,874 A | 12/1993 | Paas | |
| 5,408,827 A * | 4/1995 | Holtermann et al. | 60/298 |
| 5,488,826 A | 2/1996 | Paas | |
| 5,588,888 A | 12/1996 | Magharious | |
| 5,730,632 A | 3/1998 | Murata et al. | |
| 5,746,630 A | 5/1998 | Ford et al. | |
| 5,850,061 A | 12/1998 | Klompenhouwer et al. | |
| 5,873,330 A | 2/1999 | Takahashi et al. | |
| 5,899,174 A | 5/1999 | Anderson et al. | |
| 5,969,300 A | 10/1999 | Ford | |
| D416,537 S | 11/1999 | Imai et al. | |
| 6,024,617 A | 2/2000 | Smullin et al. | |
| 6,116,022 A | 9/2000 | Woodward | |
| 6,116,374 A | 9/2000 | Westerbeke, Jr. | |
| 6,155,896 A | 12/2000 | Suzuki | |
| 6,203,764 B1 * | 3/2001 | Benson | 422/179 |
| 6,226,984 B1 | 5/2001 | Ford | |
| 6,253,696 B1 * | 7/2001 | Mashiko | 114/55.5 |
| 6,393,775 B1 | 5/2002 | Staschik | |
| 6,461,208 B2 | 10/2002 | Suzuki et al. | |
| 6,462,459 B1 | 10/2002 | Kirkman | |
| 6,604,356 B1 | 8/2003 | Mills et al. | |
| D480,359 S | 10/2003 | Yamada et al. | |
| D488,442 S | 4/2004 | Fan | |
| 6,718,758 B1 * | 4/2004 | Suzuki | 60/300 |
| 6,820,419 B2 | 11/2004 | Ford et al. | |
| 7,309,927 B2 | 12/2007 | Sugiyama et al. | |
| 7,311,066 B1 | 12/2007 | Westerbeke, Jr. | |
| 7,314,044 B2 | 1/2008 | Westerbeke, Jr. | |
| D569,796 S | 5/2008 | Snyder | |
| D575,733 S | 8/2008 | Murata et al. | |
| 7,674,147 B2 | 3/2010 | Zwieg et al. | |
| 7,721,537 B2 | 5/2010 | Klinkert et al. | |
| 7,726,120 B2 | 6/2010 | Westerbeke | |
| 7,807,120 B2 * | 10/2010 | Hansen et al. | 423/210 |
| 7,832,196 B2 * | 11/2010 | Westerbeke, Jr. | 60/285 |
| 7,874,400 B2 | 1/2011 | Teisseyre | |
| 7,954,314 B1 * | 6/2011 | Bruestle et al. | 60/313 |
| 7,980,070 B2 | 7/2011 | Mashiko et al. | |
| D646,634 S | 10/2011 | Kipka | |
| 8,601,772 B2 | 12/2013 | Turpin et al. | |
| 2002/0000342 A1 | 1/2002 | Yamada et al. | |
| 2003/0213725 A1 | 11/2003 | Koike | |
| 2004/0199297 A1 | 10/2004 | Schaper et al. | |
| 2006/0144040 A1 | 7/2006 | Westerbeke, Jr. | |
| 2007/0130914 A1 | 6/2007 | Westerbeke, Jr. | |
| 2008/0098663 A1 | 5/2008 | Seel | |
| 2010/0025409 A1 | 2/2010 | Hunter | |
| 2012/0060474 A1 | 3/2012 | Turpin et al. | |
| 2012/0067027 A1 | 3/2012 | Turpin et al. | |

OTHER PUBLICATIONS

"Kohler Power Systems," © 2005 and 2006, Kohler Co., Kohler, WI, 1 page.

Northern Lights IN/SEP for Northern Lights Generators, © 2007, Northern Lights, Seattle, WA, 1 page.

Kohler Genset Images, at least as early as Apr. 27, 2010, 13 pages.

* cited by examiner

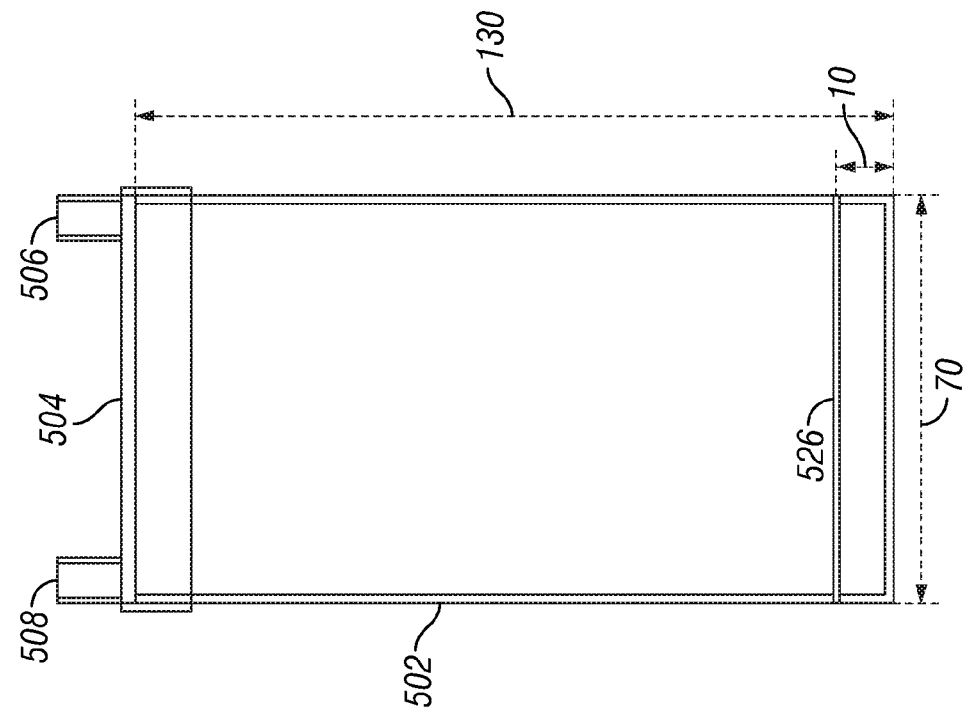
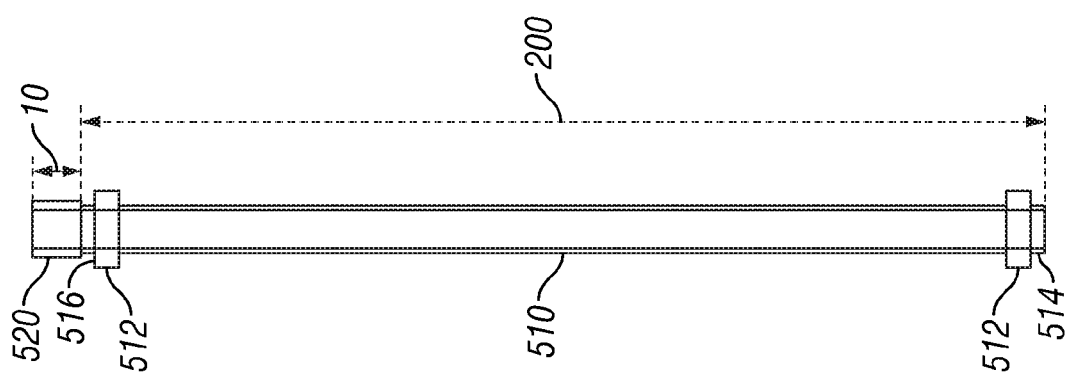

MARINE EXHAUST CATALYST

CROSS-REFERENCE TO RELATED APPLICATIONS

The present application claims the benefit of U.S. Provisional Patent Application No. 61/343,883, filed May 5, 2010, and the same is incorporated herein by reference in its entirety. The present application is related to U.S. patent application Ser. No. 13/101,972 filed May 5, 2011, to Turpin et al. and entitled "Exhaust Cooler," U.S. patent application Ser. No. 13/101,975 filed May 5, 2011, to Turpin et al. and entitled "Exhaust Injection Muffler," U.S. patent application Ser. No. 13/101,976 filed May 5, 2011, to Turpin et al. and entitled "Genset Enclosure," each of which are hereby incorporated by reference in its entirety.

BACKGROUND

The present invention relates to exhaust systems, and more particularly, but not exclusively, relates to exhaust systems in marine applications.

In marine power systems, operator safety is a top priority for power system designers and manufacturers. Because marine operators are often closer to and may come in contact with, a power system such as a genset, and/or accompanying enclosed spaces (such as below deck) may pose a combustion risk, surface temperatures of components on the genset should be reduced as much as possible. Harmful exhaust gases such as carbon monoxide should also be reduced to protect operators. The unique construction of marine vessels also presents a need for special tools to aid in the construction of such vessels. Indeed, there is an ongoing demand for further contributions in this area of technology.

SUMMARY

One embodiment of the present invention includes a unique technique involving exhaust systems in marine applications. Other embodiments include unique methods, systems, devices, and apparatus involving exhaust systems. Further embodiments, forms, features, aspects, benefits, and advantages of the present application shall become apparent from the description and figures provided herewith.

BRIEF DESCRIPTION OF THE DRAWINGS

The description herein makes reference to the accompanying drawings wherein like reference numerals refer to like parts throughout the several views, and wherein:

FIGS. 18a and 18b are elevation views of the priming tool in FIG. 17.

DETAILED DESCRIPTION OF REPRESENTATIVE EMBODIMENTS

Figure 1:
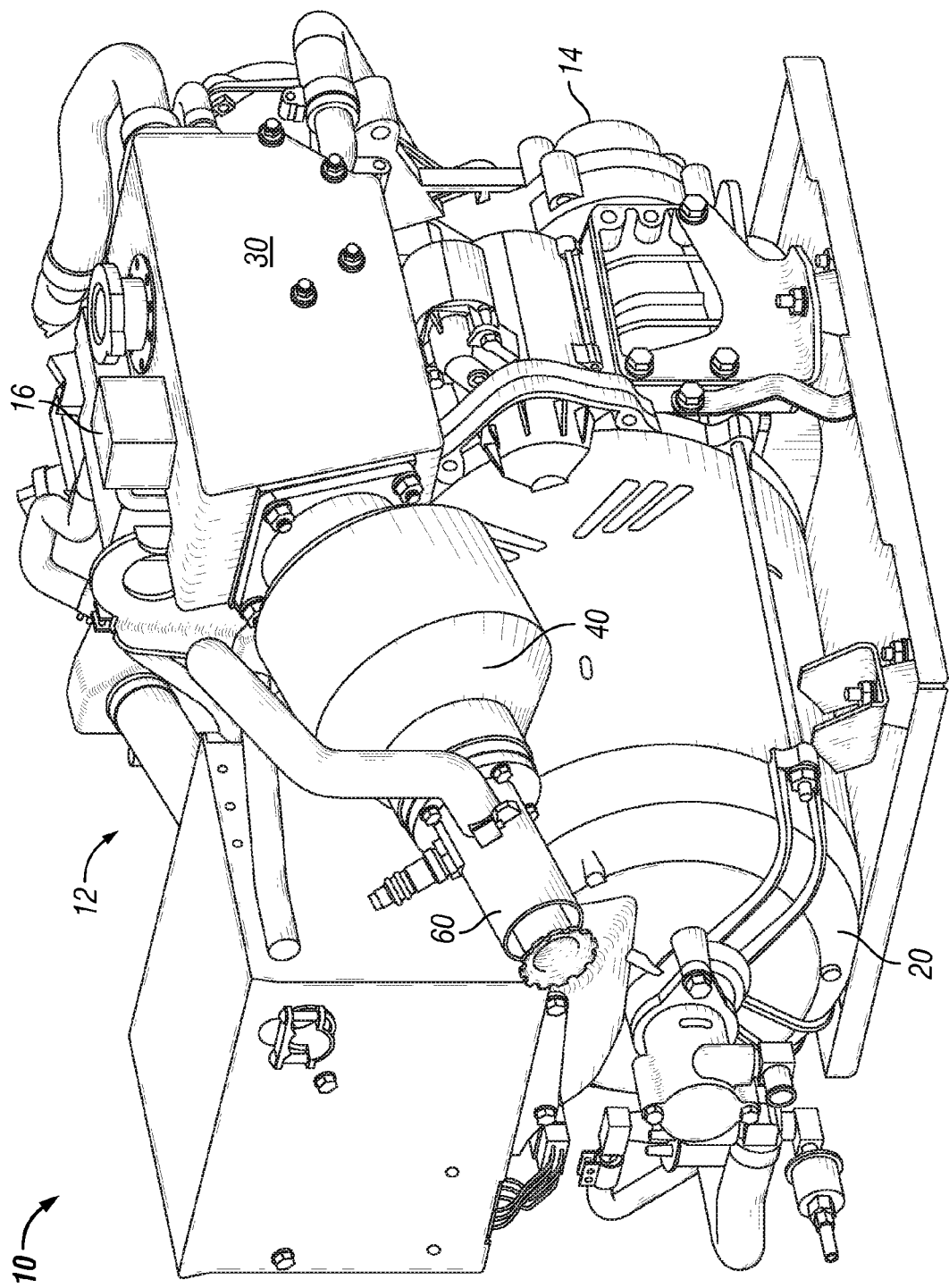
FIG. 1 is a perspective view of a system 10.

For the purposes of promoting an understanding of the principles of the invention, reference will now be made to the embodiments illustrated in the drawings and specific language will be used to describe the same. It will nevertheless be understood that no limitation of the scope of the invention is thereby intended. Any alterations and further modifications in the illustrated devices, and any further applications of the principles of the inventions illustrated and/or described being contemplated as would normally occur to one skilled in the art to which the invention relates.

FIG. 1 illustrates a system 10 including a genset 12 that may be used in a marine application. Genset 12 includes a generator engine 14 that is regulated by a controller 16, which is sometimes designated an Engine Control Module (ECM). Likewise there is a controller for genset operations that may be a part of the ECM or separate in one or more respects. In other words, one or more separate control devices may be used that are designated as a controller 16. Controller 16 is responsive to control signals from sensors as further described hereinafter. The controller 16 executes operating logic that defines various control, management, and/or regulation functions. This operating logic may be in the form of dedicated hardware, such as a hardwired state machine, programming instructions, and/or a different form as would occur to those skilled in the art. Controller 16 may be provided as a single component, or a collection of operatively coupled components; and may be comprised of digital circuitry, analog circuitry, or a hybrid combination of both of these types. When of a multi-component form, controller 16 may have one or more components remotely located relative to the others. Controller 16 can include multiple processing units arranged to operate independently, in a pipeline processing arrangement, in a parallel processing arrangement, and/or such different arrangement as would occur to those skilled in the art. In one embodiment, controller 16 is a programmable microprocessing device of a solid-state, integrated circuit type that includes one or more processing units and memory. Controller 16 can include one or more signal conditioners, modulators, demodulators, Arithmetic Logic Units (ALUs), Central Processing Units (CPUs), limiters, oscillators, control clocks, amplifiers, signal conditioners, filters, format converters, communication ports, clamps, delay devices, memory devices, and/or different circuitry or functional components as would occur to those skilled in the art to perform the desired communications.

Genset 12 also includes at least one generator 20 that provides electrical power, converting mechanical energy to electrical energy. The generator 20 is operable to generate electrical power at a generally constant speed to provide a generally fixed AC electrical power output frequency, but may vary in speed in other arrangements/embodiments. The genset 12 further includes a manifold 30, a catalyst assembly 40, and a mixer 60.

As seen in FIG. 1, the manifold 30, catalyst assembly 40, and mixer 60 may be coupled using any fastening means such as bolts, or the three pieces may be formed integral with each other (not shown), or any combination thereof. The engine 14 may be any type of combustion or reciprocating piston type engine that uses gasoline, diesel, gaseous, hybrid fueled, or fueled in a different manner as would occur to those skilled in the art.

In another embodiment, the rotational operating speed of engine 14, and correspondingly rotational speed of the generator 20 vary over a selected operating range in response to, for example, changes in electrical loading of system 10. Over this range, genset rotational speed increases to meet larger power demands concomitant with an increasing electrical load on system 10. For example, genset 12 may include one or more rectifiers to convert AC power from the generator 20 to DC power. Genset 12 may also include a DC bus coupled to the rectifier so equipment can utilize the DC power. Genset may further include one or more inverters coupled to the DC bus to convert the DC power to AC power. Equipment requiring AC power may utilize the AC power from the inverter. In one such arrangement, a variable speed genset is utilized that provides variable frequency AC to a rectifier. The rectifier outputs a DC voltage that can be used to output DC power to other devices either through a DC/DC converter, or otherwise. This DC bus can also be used as an input to one or more inverters to provide corresponding fixed frequency AC outputs. Accordingly, a variable speed genset can be utilized to provide a fixed frequency AC output with such arrangements.

Figure 2:
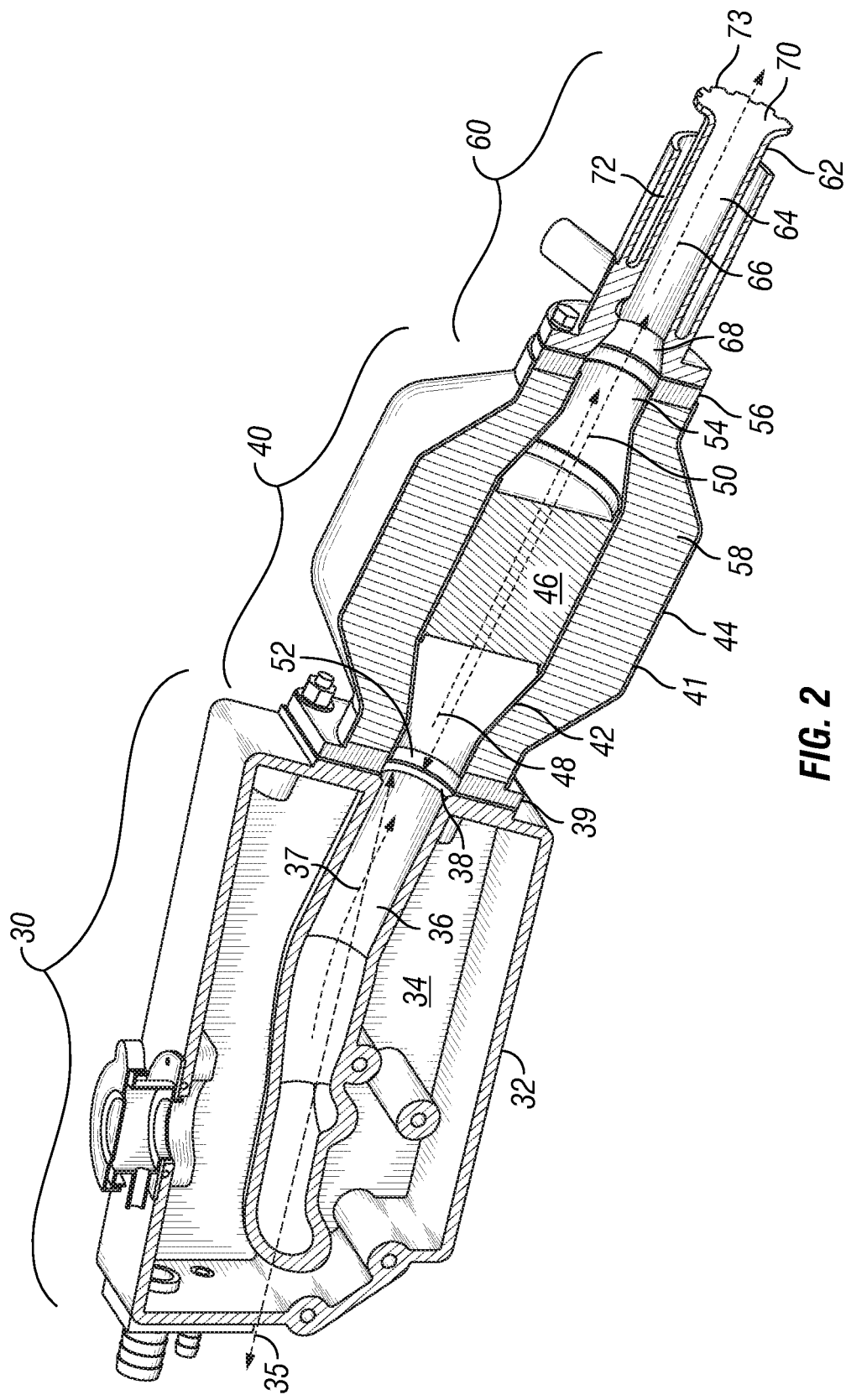
FIG. 2 is a perspective section view of a manifold, catalyst assembly, and exhaust mixer.

FIG. 2 illustrates a cross-section of an exhaust gas system of the engine 12 including the manifold 30, the catalyst assembly 40, and the mixer 60.

The manifold 30 includes a housing 32 having a chamber 34 for retaining a working fluid such as coolant, water (or seawater in may marine applications), or any other suitable working fluid known in the art or a combination thereof for regulating the temperature of the exhaust gases from the engine 14. The coolant may be circulated through a coolant loop from the engine 14. The manifold housing 32 also includes a generally longitudinal axis 35 along which a conduit 36 is situated that allows exhaust gases to flow downstream through the manifold 30 to the catalyst assembly 40. Assembly 40 is a form of exhaust emissions aftertreatment device 41. The conduit 36 defines an exhaust gas flow path 37 that flows in a generally axial direction from upstream to downstream. As seen in FIG. 2, the conduit 36 and flow path 37 have undulations. In addition, the manifold 30 has an outlet port 38 from which the exhaust gas flows out of the manifold 30 downstream into the catalyst assembly 40. Between the manifold 30 and the catalyst 40 is a gasket 39 that may include thermal insulation properties.

Figure 22:
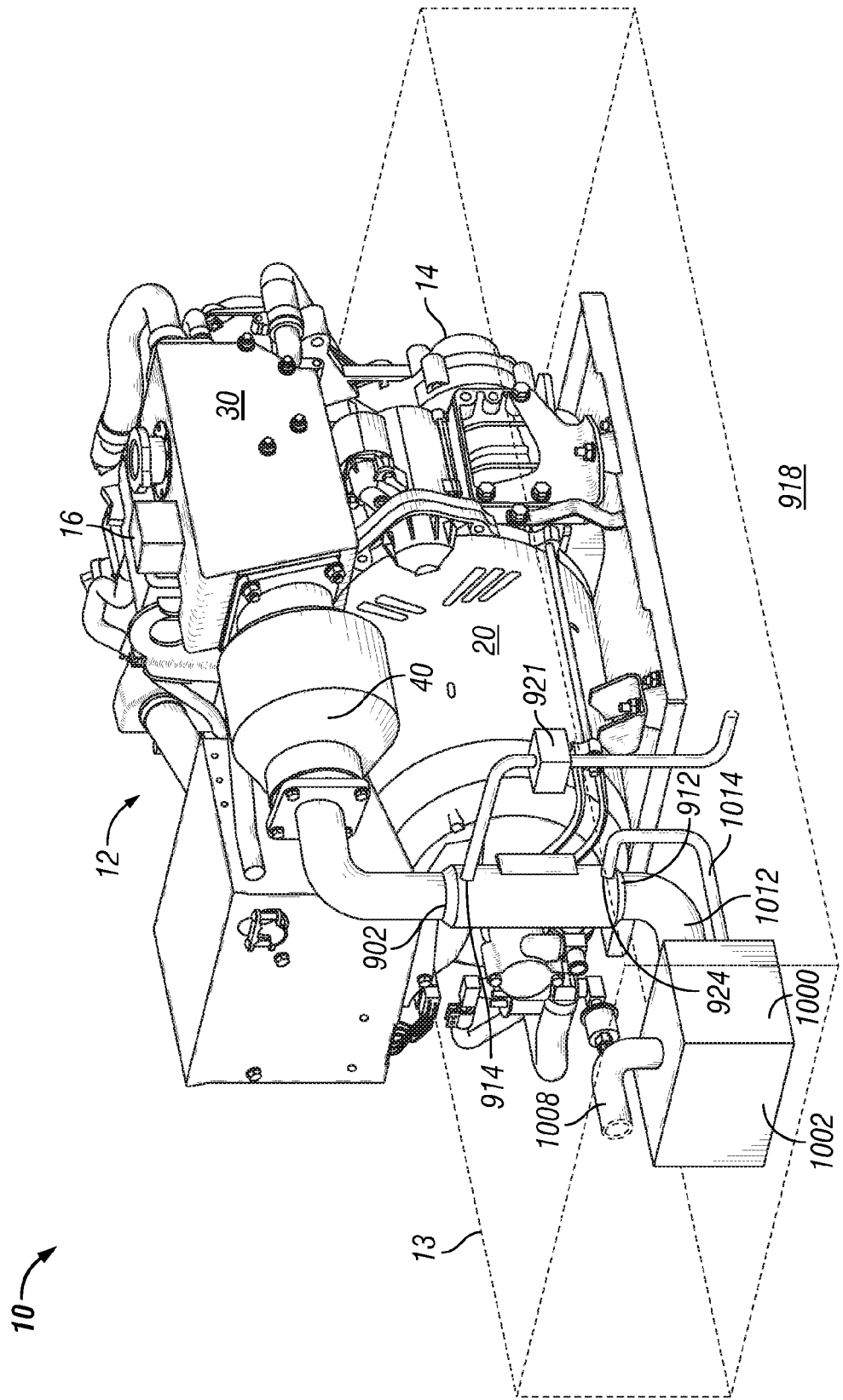
FIG. 22 is a perspective view of a genset in a watercraft.

The catalyst assembly 40 includes a tube 42 and a housing 44. As shown in FIGS. 1 and 22, the housing 44 of the catalyst assembly 40 is not symmetrical in a radial direction. It is contemplated that the housing is symmetrical in some embodiments. The tube 42 contains a catalyst 46 such as a 3-way catalyst that converts carbon monoxide (CO) to carbon dioxide ($CO_2$), reducing the CO exhaust content, among other reactions. Moreover, the catalyst 46 may reduce constituents other (e.g., hydrocarbons and NOx) of the exhaust into more desirable gases. The catalyst 46 may include, for example, any suitable metals known by those skilled in the art such as Platinum, Palladium, and/or Rhodium to name a few. Alternatively or additionally, the catalyst may convert one or more other undesired substances or constituents of the exhaust stream to one or more desired substances for discharge from system 10. The tube 42 defines an exhaust gas flow path 48 in a generally axial direction that is generally along a longitudinal axis 50 from an inlet port 52 and an outlet port 54. The tube 42 and housing 44 may have flanges (not shown) so that the two pieces can be coupled together. The longitudinal axis 35 of the manifold 30 and the longitudinal axis 50 of the catalyst assembly 40 may be parallel, but they need not be parallel as seen in FIG. 2 in which they are at an angle with respect to each other. The inlet port 52 of the catalyst assembly 40 is coupled to the outlet port 38 of the manifold 30 with the gasket 39 between them. The outlet port 54 of the catalyst assembly 30 is coupled to the mixer 60 with a gasket 56 having thermal properties in between. The housing 44 may be made of a metal such as stainless steel, which may be a cast or a spun stainless steel enclosure, to name a couple of examples.

Figure 3:
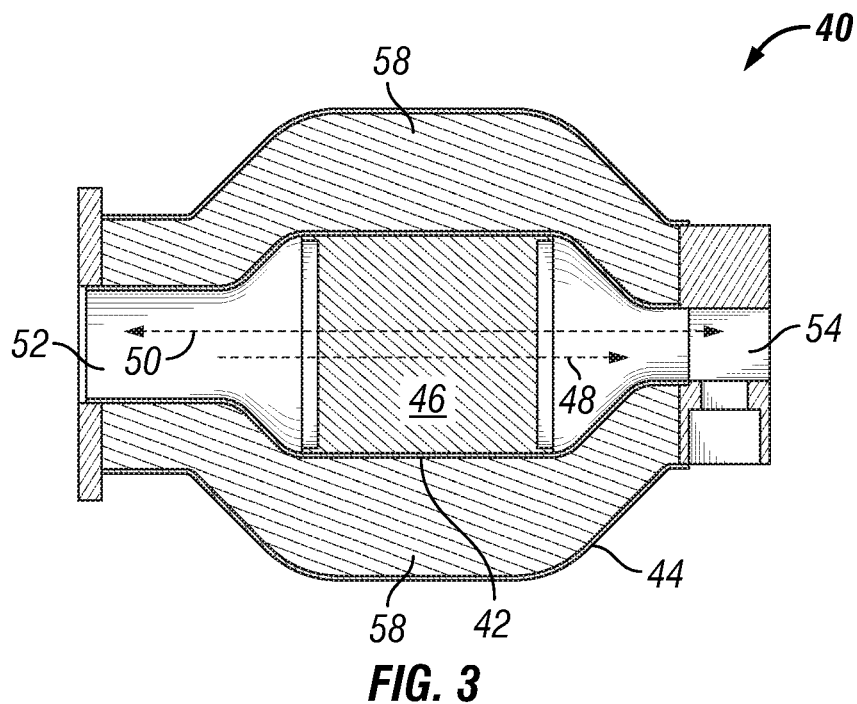
FIG. 3 is a section view of a catalyst assembly.

In certain instances, exhaust catalytic converters operate more efficiently when the catalyst 46 is at higher operating temperatures. However, in marine applications, the surface temperature of components must be limited for the safety of the watercraft's users. One common solution in marine genset exhaust catalysts is to enclose the catalyst 46 in a water-cooled housing, to achieve the desired surface temperature. However, enclosing the catalyst 46 in the water-cooled housing may unacceptably reduce the efficiency of the catalyst 46 in certain implementations. For example, the average effective area of a water-cooled catalyst at ½ load is 75% of the flow area resulting in 25% of the surface area of the catalyst being ineffective. As shown in FIGS. 2 and 3, thermal insulation 58, such as the high performance variety, is located between the tube 42 and housing 44. Using insulation 58 and a stainless steel housing 44, the catalyst 46 can maintain the desired internal temperatures, while the surface temperature meets marine requirements. Some known types of thermal insulation that may be used are Unitrax Isofrax® QSP™ Insulation, QSP Cone insulation, Vitreous Aluminosilicate Fiber, RCF, ceramic fiber, synthetic vitreous fiber (SVF), man-made vitreous fiber (MMVF), or man-made mineral fiber (MMMF).

Figure 8:
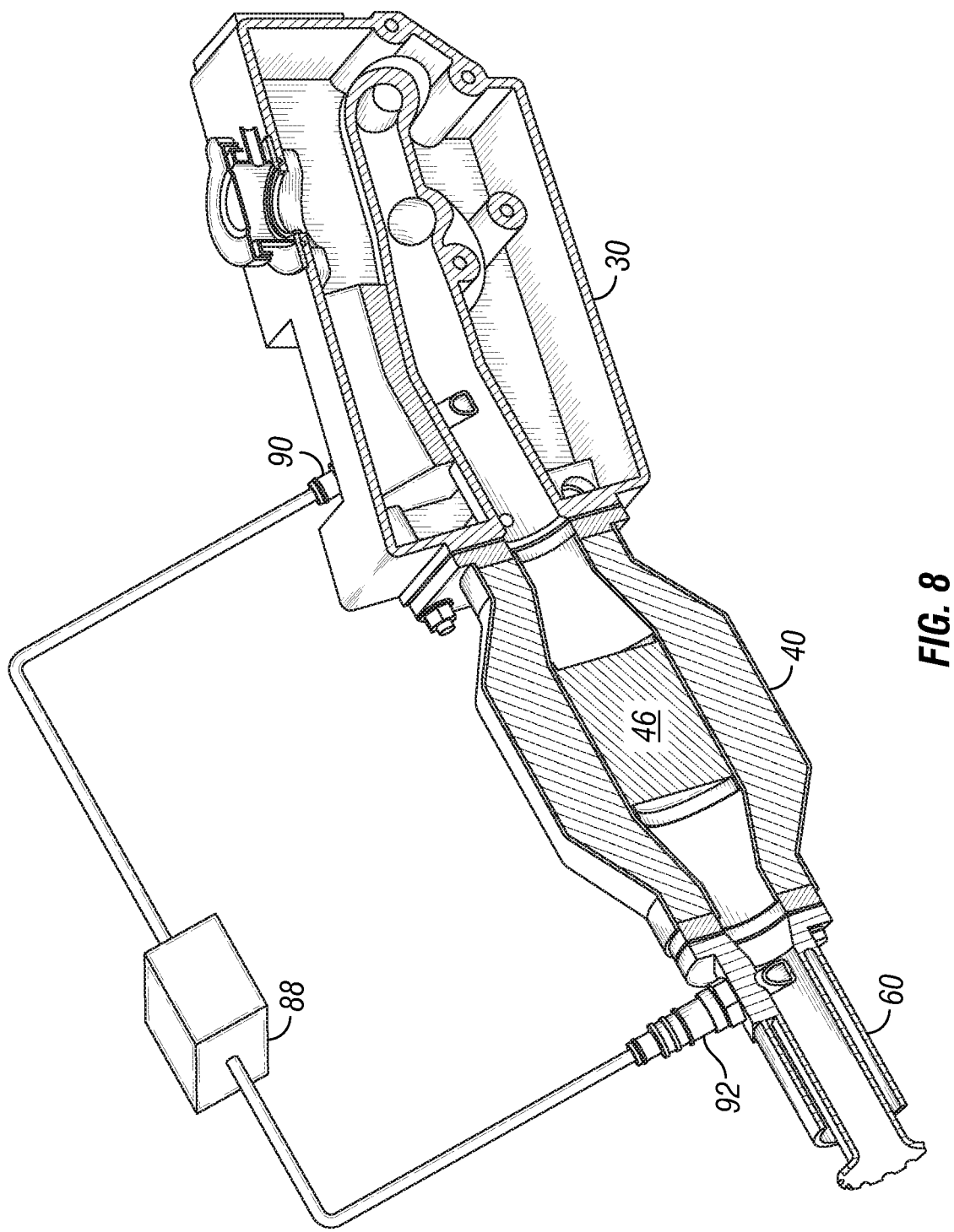
FIG. 8 is a perspective section view of a manifold, catalyst assembly, and exhaust mixer.
Figure 23:
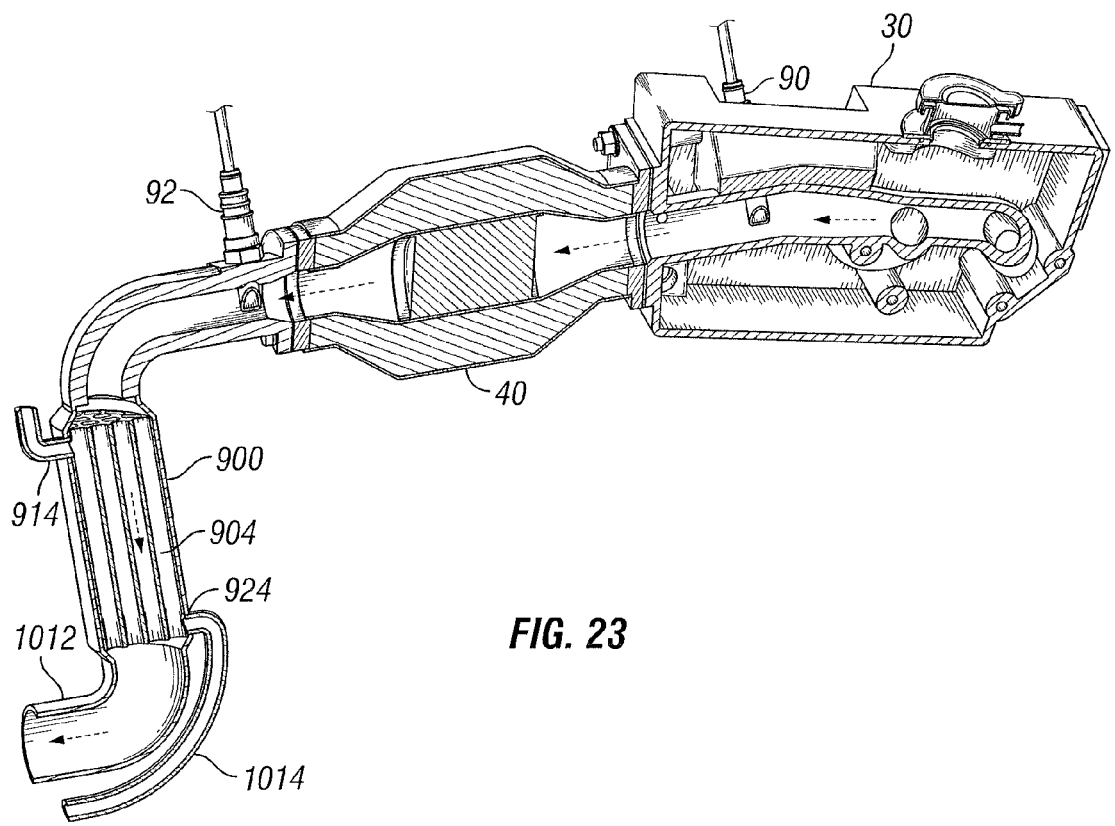
FIG. 23 is a perspective section view of a manifold, a catalyst assembly, and an exhaust cooler.

In addition, as seen in FIGS. 8 and 23, a sensor 90 may be installed in the exhaust manifold 30 that senses oxygen, and in particular O2, in the exhaust gas stream ahead (upstream) of the catalyst 46. The sensor 90 output may be used, for example, by the controller 16 to regulate the engine air/fuel ratio. Another sensor 92 may be installed downstream of the catalyst 46. Second sensor 92 also may be configured to sense the concentration of oxygen in the exhaust gases. Further, the second sensor 92 is used to confirm appropriate performance of the catalyst, such as verifying expected CO reduction or the like.

Figure 4:
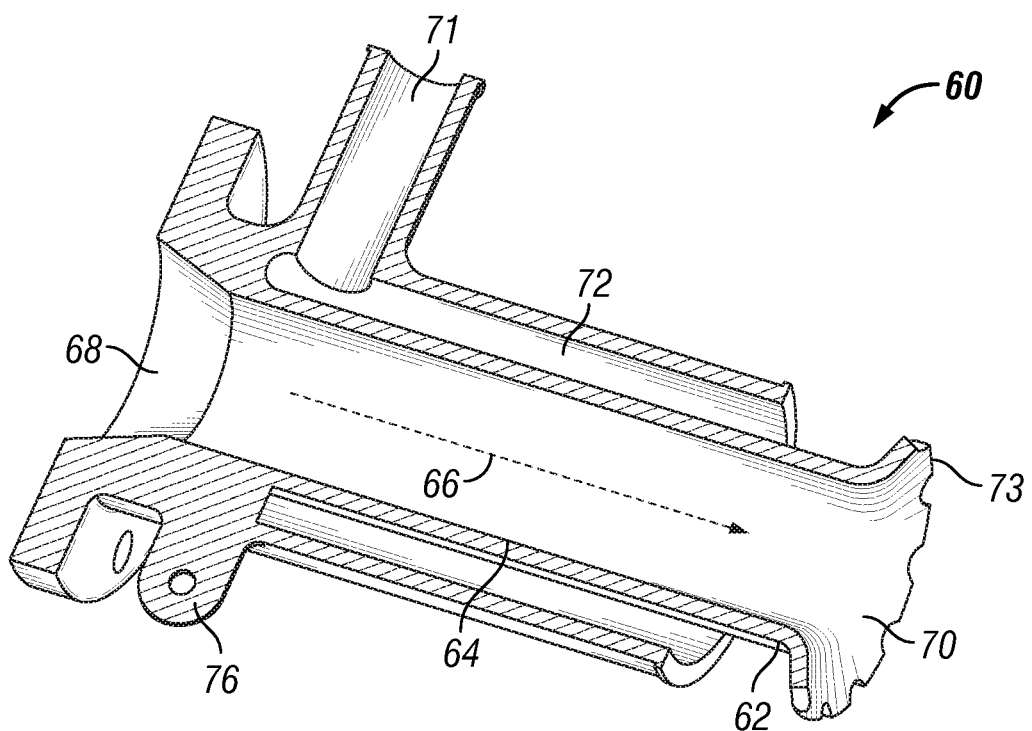
FIG. 4 is a perspective cross-section view of an exhaust mixer.
Figure 5:
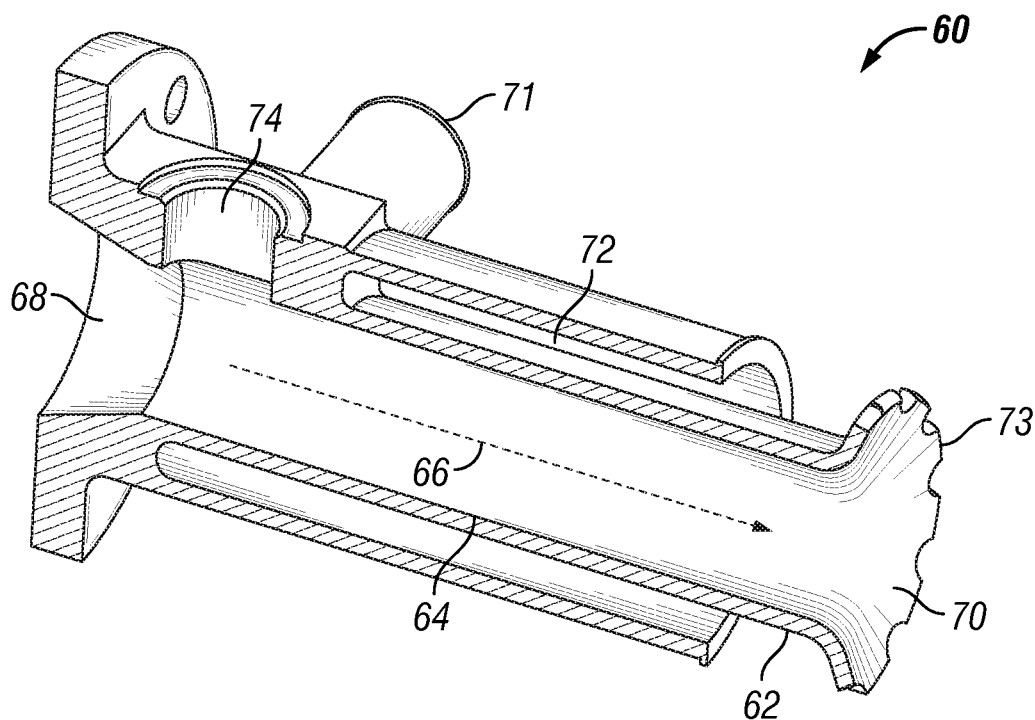
FIG. 5 is a perspective cross-section view of an exhaust mixer.

FIGS. 4 and 5 illustrate one embodiment of the exhaust mixer 60 designed to operate with the catalyst assembly in FIGS. 2 and 3. For some marine gensets a "wet" exhaust is where cooling water is injected into the exhaust stream. Generally, it is desirable to prevent water contact with the second downstream sensor 92 if it is sensitive to water impingement. The mixer also has a nozzle 62 that is designed to prevent water impingement on the second sensor 92 (see FIGS. 8 and 23).

As seen in FIG. 4, the mixer 60 includes a conduit 64 that defines an exhaust flow path 66 in a generally axial direction from an inlet port 68 to an outlet port 70 located in the general area of the nozzle 62. The mixer's inlet port 68 is coupled to the catalyst assembly's outlet port 54 with the gasket 56 between them.

The mixer 60 also includes a water inlet 71 that allows water to flow into an annular passage 72. The water may be taken from the body of water that the watercraft is currently in such as a stream, lake, sea, or ocean. The annular passage 72 surrounds the exhaust flow path 66 and thus cools the exhaust gas temperature when water flows throughout the annular passage 72. As water exits the annular passage 72, it comes in contact with the nozzle 62, and in particular, a flared and serrated end 73 that allows the water to be injected and mixed with the exhaust gas stream. In addition, the mixer 60 directs the water down and away from the catalyst 46.

FIG. 5 illustrates an opening 74 that receives the second sensor 92. The opening 74 for the sensor 92 is in fluid communication with the exhaust flow path 66 allowing the sensor 92 to measure, for example, the concentration of oxygen in the exhaust gas flow path. In addition, mixer 60 is designed such that the sensor 92 is not in fluid communication with the annular passage 72. FIG. 4 also shows a flange 76 that is structured to mount a high exhaust temperature (HET) Switch (not shown).

Figure 6:
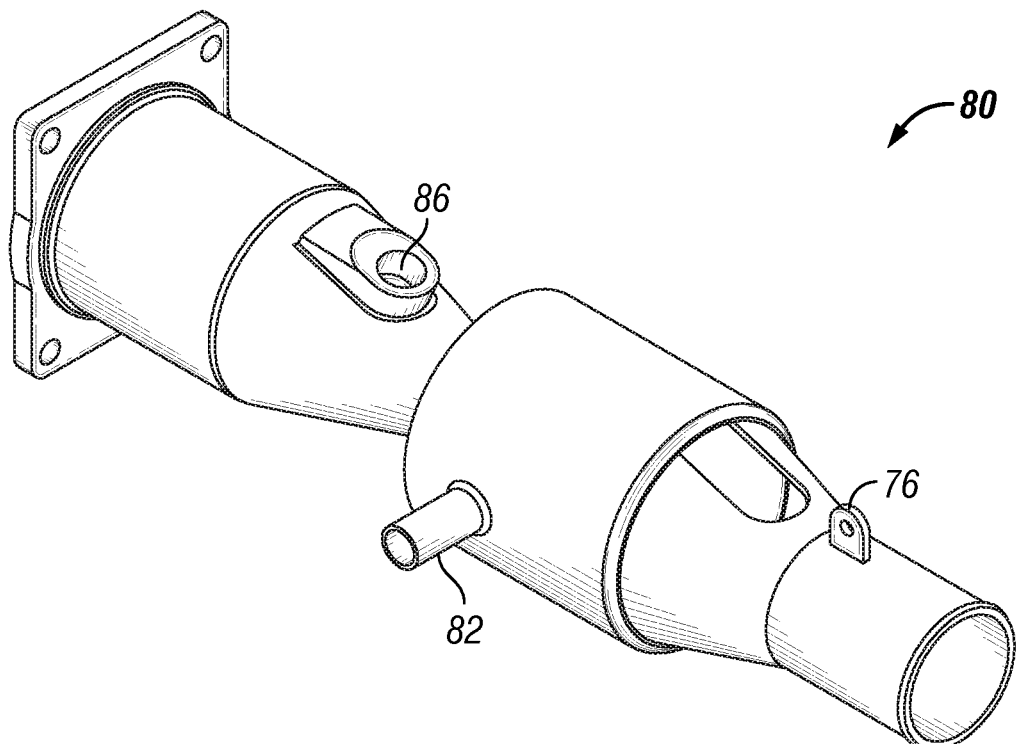
FIG. 6 is a perspective view of an exhaust mixer.
Figure 7:
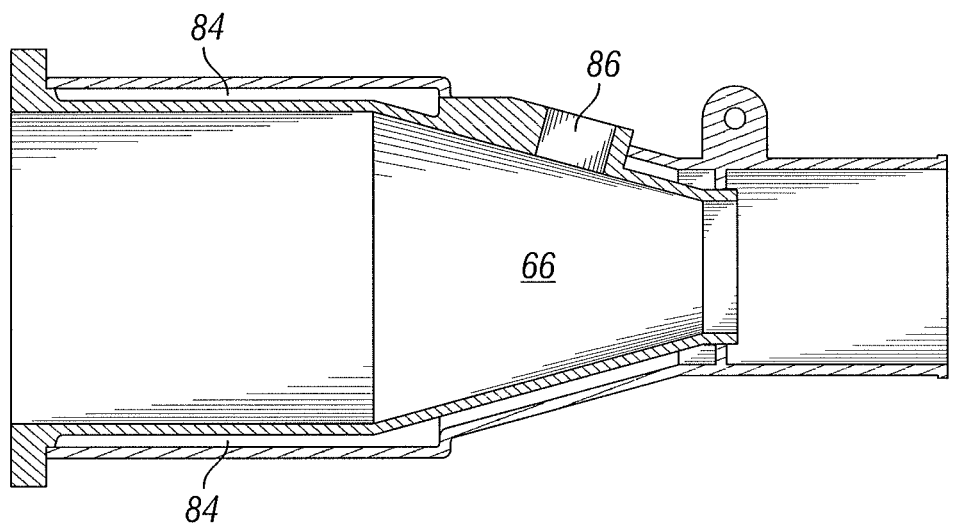
FIG. 7 is a elevation section view of an exhaust mixer.

FIGS. 6 and 7 illustrate another embodiment of a mixer 80 that is designed to operate with a catalyst having a water-cooled jacket instead of or in addition to insulation as shown in FIGS. 2 and 3. Like reference numerals are used to designate like parts where appropriate. The mixer 80 can be constructed from two pieces that are welded together as seen in FIG. 6. The mixer includes a water inlet 82 that allows water to flow into a generally annular passage 84. The mixer 80 also includes an opening 86 for receiving the sensor 92. As shown in FIG. 7, the opening 86 is not in fluid communication with the annular passage 84. Additionally, both mixers 60 and 80 may be made of stainless steel in an investment casting process.

In another embodiment, a catalyst efficiency monitor 88 ("CEM") is shown in FIGS. 8-11, which may be included in the form of operating logic executed by controller 16, previously described. Over time, the catalyst 46 may deteriorate as a result of increased engine exhaust emissions. This modality requires regular and conservative maintenance intervals to insure that the catalyst 46 is operating properly, which increases operating costs. Also, operating conditions may cause an earlier than expected deterioration of the catalyst 46, leading to higher emissions and potential environmental, health, or safety issues. As seen in FIG. 8, the sensor 90 is located ahead of the catalyst 46 inside the manifold 30 and the sensor 92 is located inside the mixer 60 downstream of the catalyst 46.

In one embodiment, the CEM, including controller 16, continuously evaluates a signal from the sensor 90 that is representative, for example, of the concentration of oxygen in the exhaust gas stream. The controller also evaluates a signal from the sensor 92 that is representative, for example, of the concentration of oxygen in the exhaust gas stream. If catalyst efficiency begins to deteriorate, the CEM informs the operator by illuminating a warning light for example, and shuts down the genset 12.

The CEM offers several advantages including providing a cost effective way to maintain low emission levels. Maintaining low CO emissions is particularly desired for marine applications as they relate to carbon monoxide safety concerns.

In another embodiment, the CEM 88 regularly evaluates the performance of the exhaust catalyst 46 and notifies the operator if the catalyst 46 needs to be checked or replaced. The CEM 88, including controller 16, measures the amount of oxygen going through the catalyst 46 via sensors 90 and 92. If the CEM 88 detects increased oxygen flow through the catalyst 46, the catalyst 46 has deteriorated, and this decrease in efficiency would allow an increase in production of carbon monoxide and other pollutants. The operator is notified and action can be taken to repair the catalyst 46, and/or take other action or make other adjustments as warranted.

As discussed above, CEM hardware includes sensors 90, 92 and the controller 16. Furthermore, the controller 16 receives input from several sensors, processes the information, and provides feedback to the operator about the status of the catalyst if needed. In one embodiment, sensors 90 and 92 are two heated oxygen sensors and are the primary sources of information to the controller 16. One oxygen sensor 90 is located in the engine exhaust flow upstream of the catalyst 46 and one oxygen sensor 92 is located in the exhaust downstream of the catalyst. Other sensors provide information about the conditions and operating state of the genset 12.

The upstream oxygen sensor 90 in the exhaust manifold 30 responds to the presence of oxygen in the exhaust gas, providing feedback to the engine controller 16. The controller 16 regulates fuel injection to maintain a lean air-to-fuel ratio. This closed loop, lean engine system reduces engine carbon monoxide emissions (CO) from about 400 gm/kW-hr in a rich carbureted engine to about 40 gm/kW-hr or less. The upstream oxygen sensor 90 switches frequently between 0.3 and 0.9 V in response to the level of oxygen in the exhaust. The catalyst 46 contains precious metals on a substrate. It facilitates the conversion of free oxygen ($O_2$) and CO in the exhaust to $CO_2$ because $CO_2$ is less dangerous than CO. The catalyst 46 reduces CO out of the engine 14 from about 40 gm/kW-hr to about 4 gm/kW-hr or less. Catalyst 46 performance tends to degrade slowly over time due to contamination, and wear and deterioration of the precious metals or substrate. It is contemplated that the controller 16 may regulate fuel injection to maintain a stoichiometric air-to-fuel ratio.

The downstream oxygen sensor 92 responds to the oxygen that passes through the catalyst 46 by switching. In principle, no oxygen exits the catalyst 46 when the catalyst 46 is operating correctly. The downstream oxygen sensor 92 would normally switch infrequently because very little oxygen is available. The catalyst 46 has failed if oxygen is passing freely through the catalyst 46. By comparing the upstream and downstream oxygen sensor switching frequencies, the CEM can detect low efficiency in the catalyst (a failed or poorly performing catalyst 46).

As described below, air may be injected into the exhaust flow path after the upstream oxygen sensor 90. This "secondary air" helps improve the performance of the catalyst 46. This secondary air contains oxygen, which supplements the small amount of oxygen that comes from combustion to reduce CO.

The flow of excess oxygen from secondary air may overwhelm the catalyst 46, and some oxygen may pass through a functioning catalyst 46. To avoid this, the CEM 88 turns off the secondary air during the test. Also, high engine loads create NOx in the exhaust. The catalyst frees the nitrogen, creating free oxygen in the exhaust. Because of this characteristic, the CEM test is conducted at less than half load.

Figure 9:
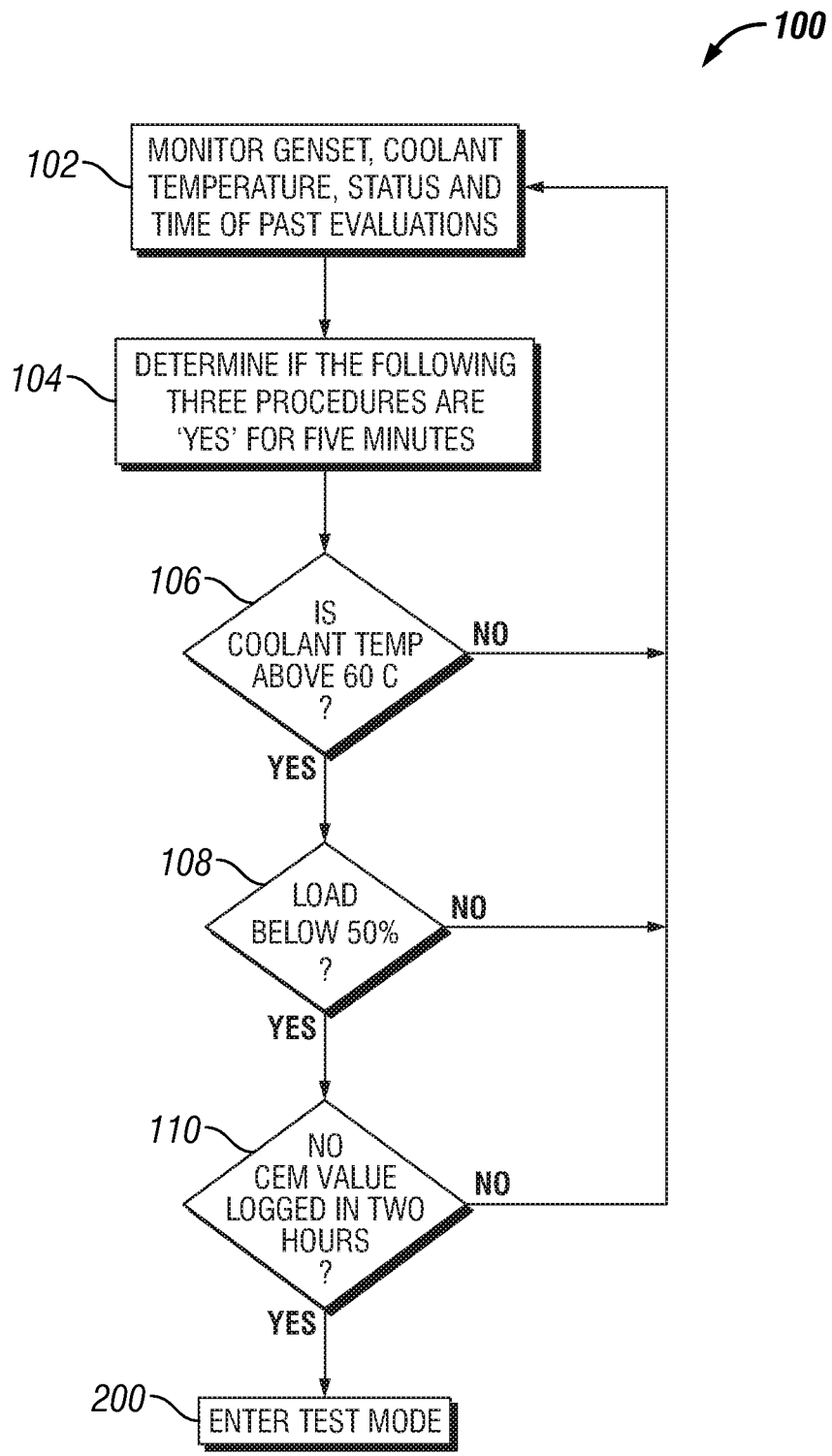
FIG. 9 is a schematic flow diagram of procedure for monitoring catalyst efficiency.
Figure 10:
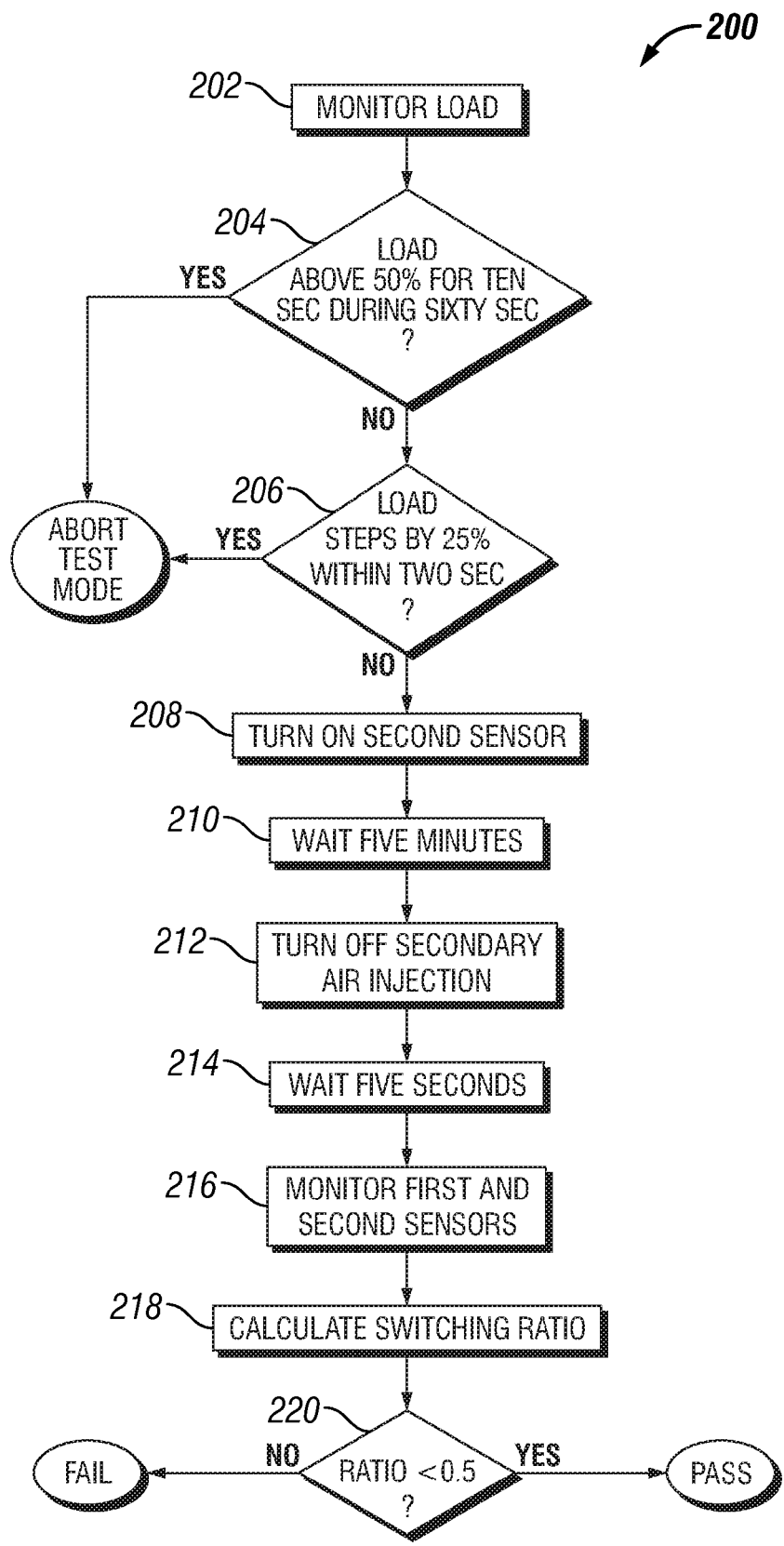
FIG. 10 is a schematic flow diagram of procedure for monitoring catalyst efficiency.
Figure 11:
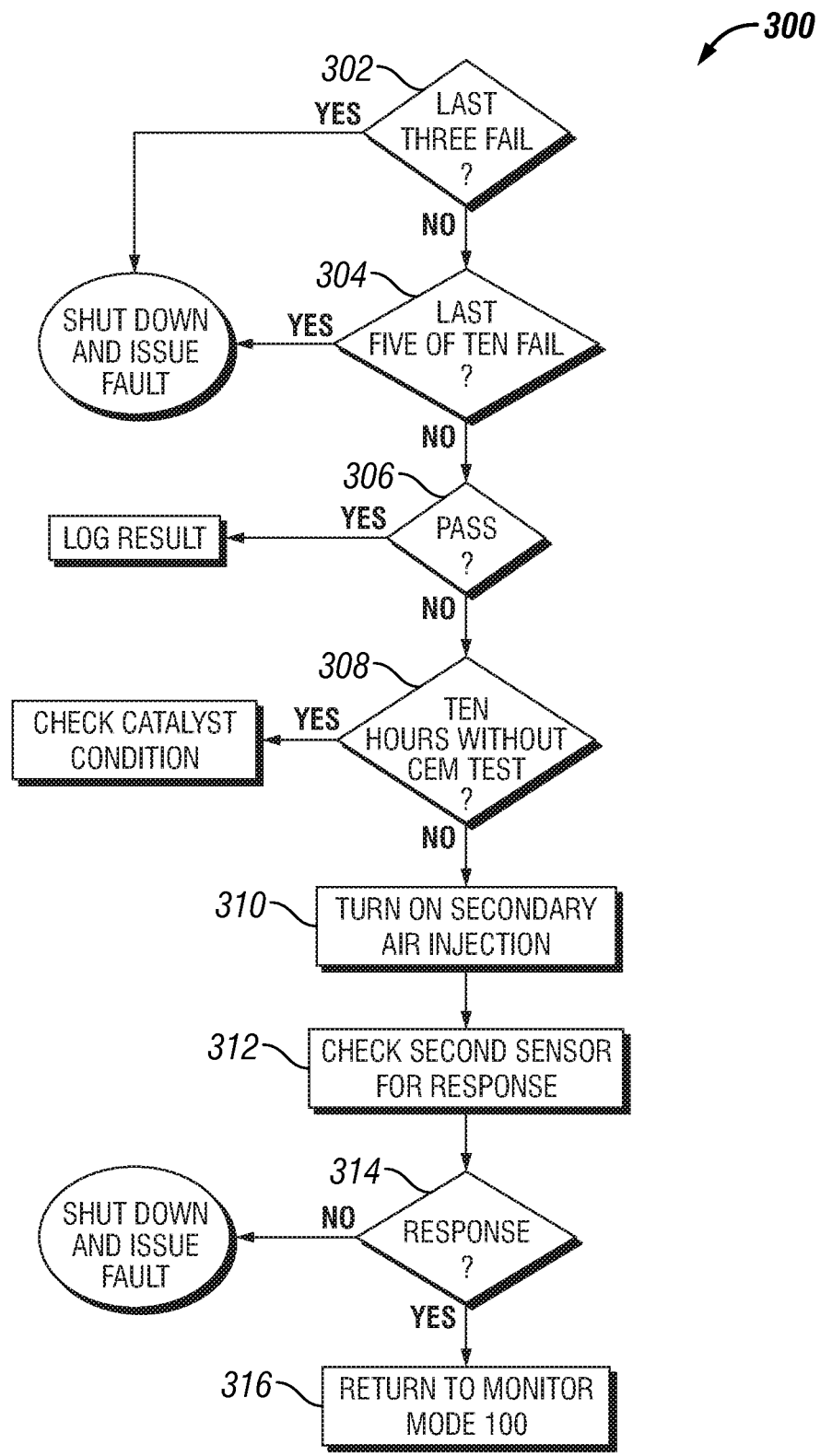
FIG. 11 is a schematic flow diagram of procedure for monitoring catalyst efficiency.

FIGS. 9-11 are three flowcharts illustrating an operating procedure for the CEM 88. Operations illustrated are understood to be exemplary only, and operations may be combined or divided, and added or removed, as well as re-ordered in whole or in part, unless explicitly stated to the contrary. FIG. 9 illustrates the operating procedure of the controller 16 in a CEM monitor mode 100. In operation 102, the controller 16 continuously monitors the genset load and coolant temperature as well as the status and time of past CEM evaluations. In operation 104, a clock or timer tracks the time to determine whether the following three procedures 106, 108, and 110 are "yes" for five minutes. In operation 106, it is determined whether coolant temp is above 60 C. In operation 108, it is determined whether load is below 50%. In operation 110, it is determined whether no CEM value was logged in two hours. If the answer to procedures 106, 108, and 110 are all "yes," then the controller 16 enters a test mode 200, otherwise the controller continues in the monitor mode 100.

FIG. 10 illustrates an operating procedure for the test mode 200. In operation 202, load is continuously monitored during test mode 200. In operation 204, if the load goes above 50% for 10 cumulative seconds during 60 seconds, test mode 200 is aborted. In operation 206, if the load steps by 25% within 2 seconds, test mode 200 is aborted and returned to monitor mode 100. In operation 208, the downstream sensor 92 and/or heater is turned on. In operation 210, the system waits five minutes. In operation 212, secondary air injection is turned off. In operation 214, the system waits 5 seconds. In operation 216, the upstream oxygen sensor 90 and downstream oxygen sensor 92 are monitored for 60 seconds (recording frequency of switching, monitor coolant temperature and load). In operation 218, the system calculates average switching ratio by dividing the frequency of downstream oxygen sensor 92 by the frequency of the upstream oxygen sensor 90. In operation 220, if the switching ratio is greater than or equal to 0.5, then the CEM code is "FAIL," which is logged. If switching ratio is less than 0.5, then the CEM code is "PASS," which is logged.

FIG. 11 illustrates an evaluation mode 300. In operation 302, if the last three CEM codes are "FAIL," then the genset 12 is shut down and a fault code for CEM is issued. In operation 304, if five out of the last 10 CEM codes are "FAIL," then the genset 12 is shut down and a fault code for CEM is issued. It should be noted that in one embodiment, the genset 12 can be restarted and run for two hours each time the genset 12 shuts down and issues a CEM fault code. In operation 306, if the code is "PASS," then the test result is logged and the next operation is executed. In operation 308, if the genset 12 has accumulated 10 hours without a CEM test (due to running at full load or running for a shorter time than required to warm the genset): Declare a "Check Catalyst" condition, Blink the amber start switch light (fault indicator light) while the genset 12 is running (steady green run light stays on also). The manual and labels state that the genset 12 needs to be run at light load for a catalyst check when the genset is running and the fault light is blinking. Once a "PASS" or "FAIL" is logged, the genset yellow flashing light is turned off. In operation 310, the secondary air injection is turned on. In operation 312, the downstream oxygen sensor 92 is checked for a response. In operation 314, if the downstream oxygen sensor 92 does not respond to oxygen, the genset 12 is shut down and a secondary air injection fault code issued. In operation 316, the controller returns to monitor mode 100.

In another embodiment, a genset CEM event occurs when engine coolant temperature is >60° C., when load is <50%, and it has been two hours since the last evaluation.

In one embodiment, an evaluation procedure includes the following operations. The downstream oxygen sensor heater is turned on. It is normally off to maximize the life of the oxygen sensor. After the oxygen sensor heater has been on for 5 minutes the secondary air injection will be shut off via electronic valve. The upstream and downstream oxygen sensors will be monitored for 1 minute then the switch ratio will be calculated. If the switch ratio is less than 0.5, a PASS will be declared and logged. If the ratio is greater than 0.5, a FAIL will be declared and logged.

In another embodiment, a fault procedure includes the following operations. If there are 3 recorded FAILs in a row, the genset will be shut down and a fault will be declared. If 5 out of the last 10 are recorded as FAIL, the genset will be shut down and a fault will be declared. If there is a fault, the genset will restart, but only operate for 2 hours. If there are no CEM tests in a reasonable time, the amber light would blink, notifying the operator to run at light load for a catalyst check. Upstream HO2S fault results in immediate shut down and fault issued. Genset will not run with this fault condition.

In another embodiment, the CEM functions by observing the switching frequencies of the first and second O2 sensors. The upstream HO2S switches frequently because the lean closed loop engine has O2 in the exhaust flow. The downstream HO2S does not switch if all O2 is consumed in the catalyst. A switching ratio is calculated by dividing the downstream switching frequency by the upstream switching frequency. In a new catalyst, the upstream HO2S switches at 100 Hz. The catalyst is functioning, combining the O2 with other elements. The downstream HO2S sees very little O2, so the switching frequency is 0. The CEM switching ratio is 0/100=0. In a non-functioning catalyst, the upstream HO2S frequency is 100 Hz. The downstream HO2S sees the same O2, so its frequency is also 100 Hz. The switching ratio is 100/100 or 1.0. When the switching ratio is above 0.5, the catalyst has significantly degraded.

Figure 12:
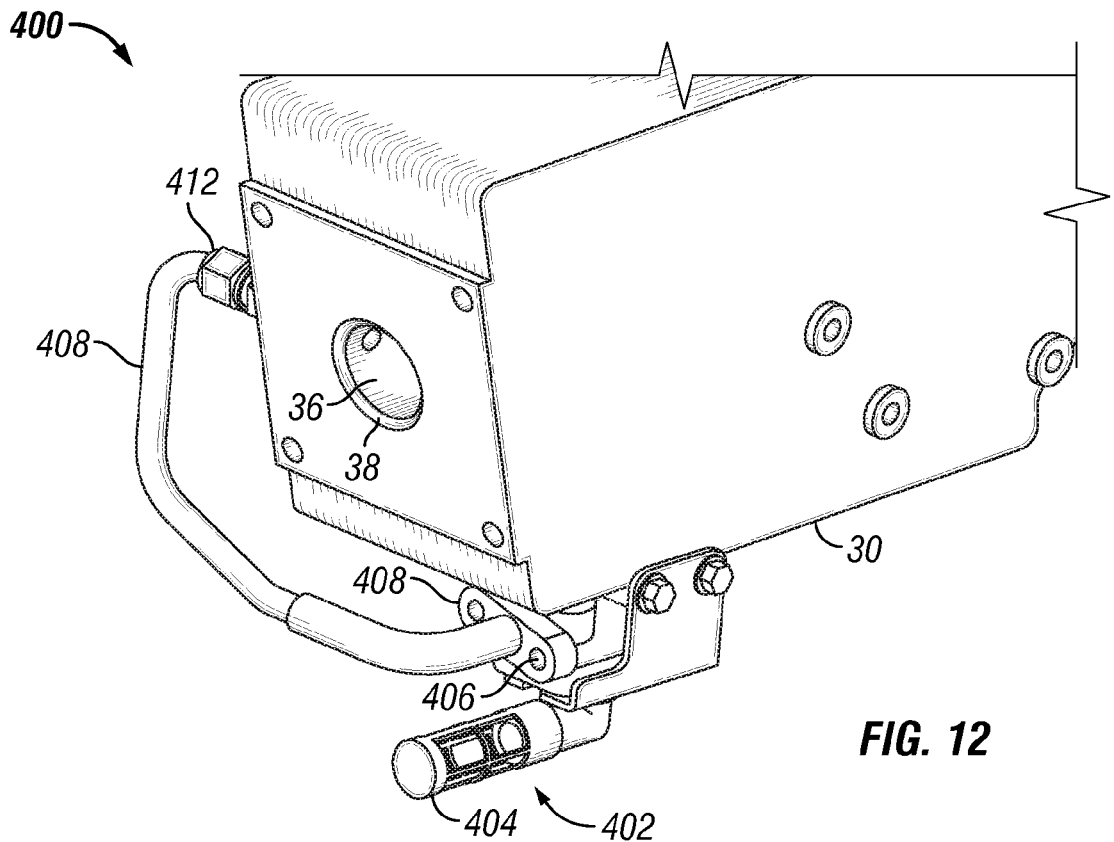
FIG. 12 is a perspective view of a secondary air system.

FIG. 12 illustrates a secondary air system 400 for the catalyst 46. Maintaining low CO emissions is desired for marine applications as they confront significant safety issues related to carbon monoxide build-up. Secondary air injection is a relatively low cost way to reduce CO emissions. Catalytic converters, such as the catalyst assembly 30, may convert CO to CO2 at a high efficiency rate with more oxygen. In addition, oxygen is generally needed to convert the NOx in the exhaust stream into molecular nitrogen (N2) for discharge. When the engine is not capable of running in a lean condition, a secondary source of oxygen may be needed.

As seen in FIG. 12, an air intake 402 draws in atmospheric air. A filter 404 is coupled to the air intake 402 to filter contaminants from the atmospheric air. After the air has passed through the filter 404, the air flows through a valve 406, which regulates the air flow. The valve 406 may be, for example, a reed valve. The valve 406 uses the pulses of the exhaust system to draw additional oxygen into the exhaust flow ahead of the catalyst 46. An air tube 408 has a first end 410 coupled to the valve 406 and a second end 412 coupled to the manifold 30. This allows air to flow through the air tube 408 from the valve 406 to the manifold 30. In particular, air from second end 412 of the air tube 408 is injected into the conduit 36 near the outlet port 38 of the manifold 30 containing the exhaust gas stream.

The secondary air system 400 may be used in either a fixed speed or variable speed genset. In addition, a solenoid valve may be used in the secondary air system 400 so that it operates with the catalyst efficiency monitor discussed above. In addition, the air tube 408 may be a tuned tube 408 to ensure the proper delivery of air into the exhaust gas stream.

FIGS. 13-16 illustrate a genset enclosure such as a sound shield 700, which encases the genset 12 and protects it from the surrounding environment as well as protects operators from the genset 12. For the present state of the art, the sound shield is installed on the genset when it is shipped to a boat builder or other installer. The boat builder then removes the sound shield from a genset and installs the genset in the boat. After installation of the genset, the boat builder will later need to find the sound shield parts and reassemble the sound shield. Keeping track of the sound shield parts and keeping them clean and free from damage has become an inconvenience for the boat builders, and the disassembly followed by reassembly consumes labor and time.

In one embodiment, at least a portion of the sound shield is packaged in a box with a handle. The packaged sound shield is placed inside the genset shipping crate, but not assembled about it. When the genset is removed from the crate and installed in a boat, the sound shield (still packaged) can be stored and then brought to the boat for installation once the genset is installed or at such later time as deemed appropriate. This approach may include several features such as allowing the sound shield pieces to remain together, facilitating transportation of the sound shield pieces, and ensuring that the sound shield pieces remain clean.

Figure 13:
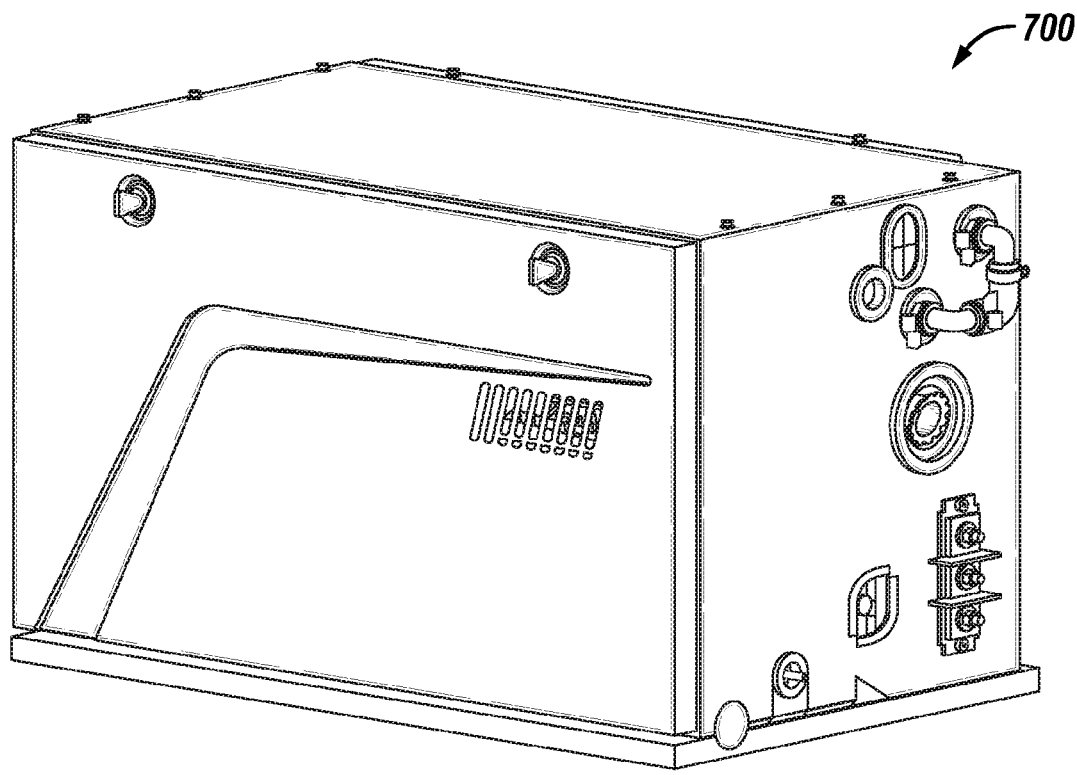
FIG. 13 is a perspective view of a genset.
Figure 14:
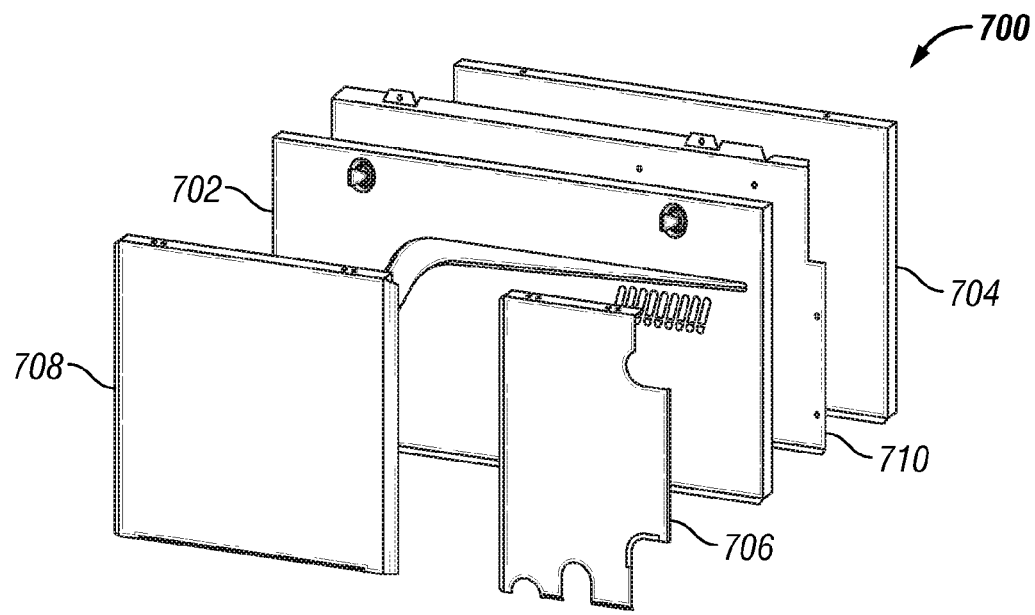
FIG. 14 is a perspective view of panels for a genset.
Figure 15:
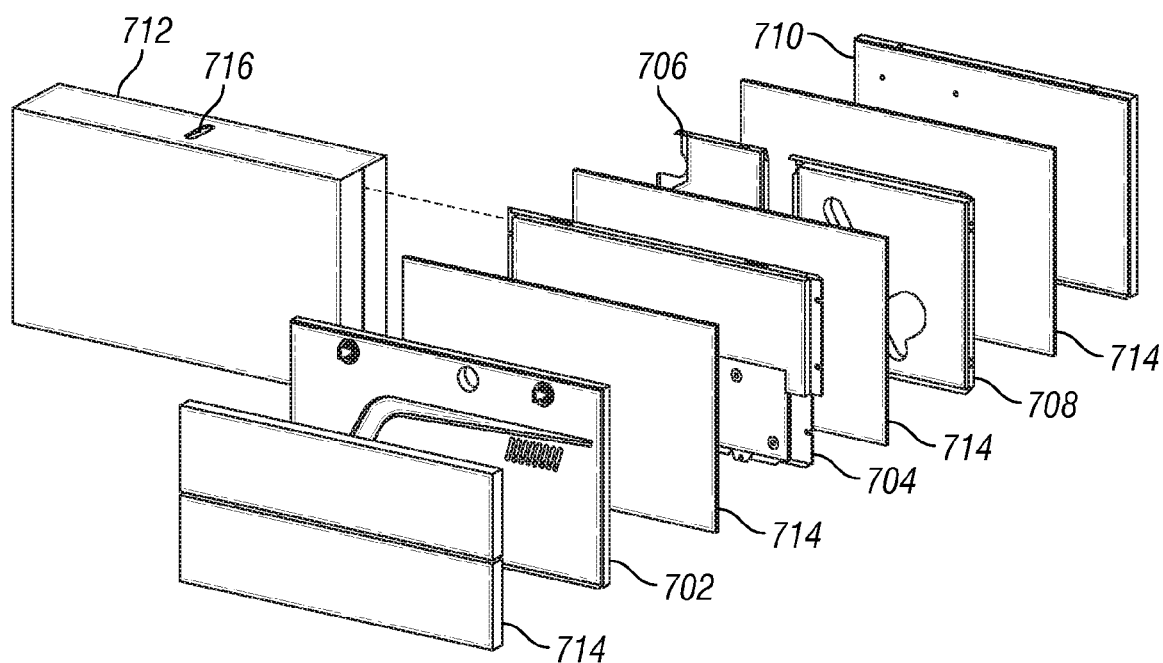
FIG. 15 is a perspective view of panels for a genset and a box.
Figure 16:
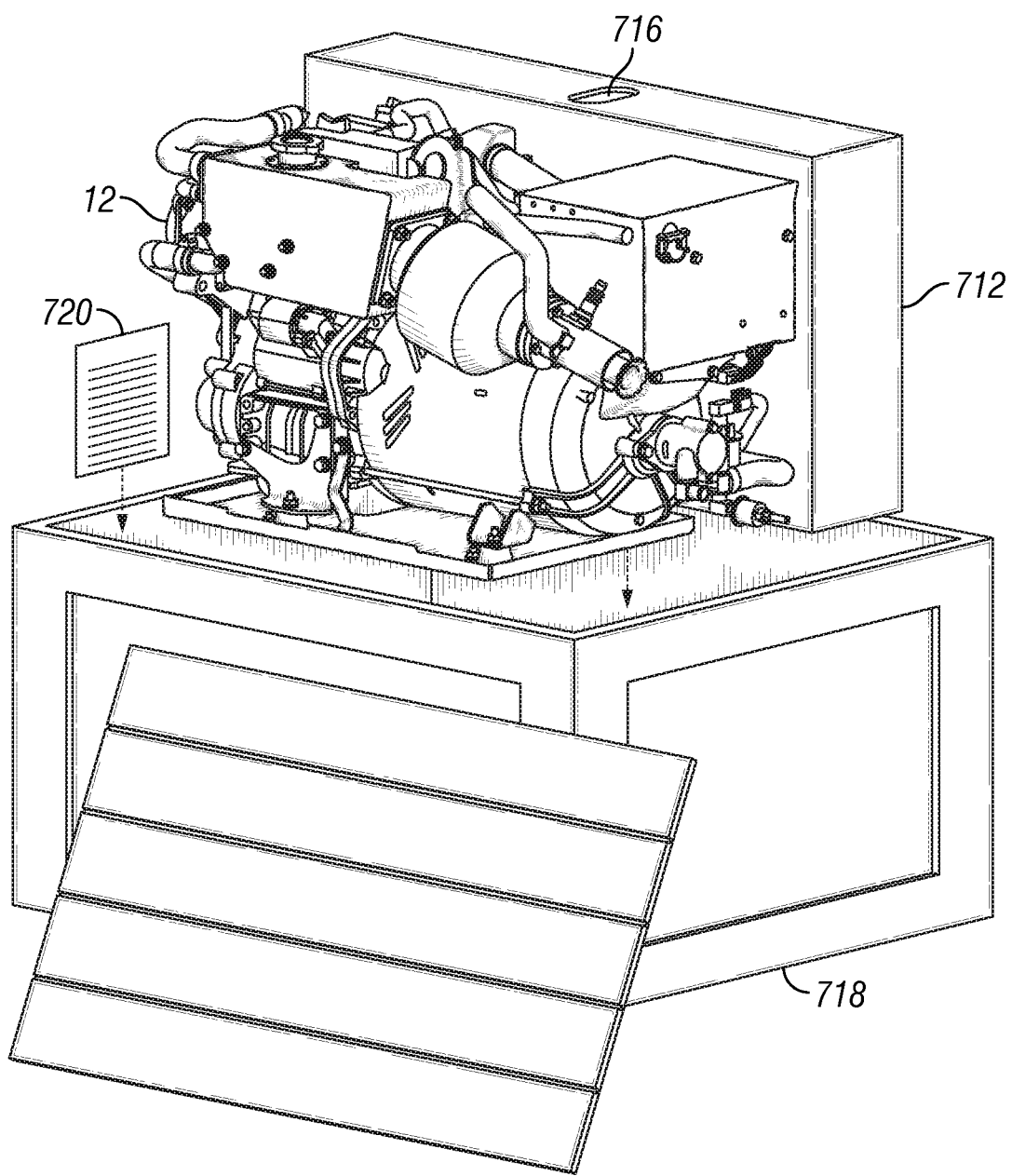
FIG. 16 is a perspective view of a genset, a box, and a crate.

FIG. 13 illustrates a sound shield enclosure 700 installed on a genset 12. FIG. 14 illustrates one type of sound shield that has five pieces, but sound shields having more than or less than five pieces are contemplated and will work correctly with the sound shield enclosure 700. The sound shield enclosure 700 includes the following pieces: a front panel 702, a back panel 704, a right panel 706, a left panel 708, and a top panel 710. It should be noted that any reference to orientation or size of the pieces is only for explanatory purposes and should not be construed as a limitation. FIG. 15 illustrates how the five pieces 702, 704, 706, 708, 710 are packaged in a box 712. Between each piece is a protective insert 714. Moreover, each of the pieces 702, 704, 706, 708, 710 and the protective inserts 714 are placed in the box 712 laterally to reduce the area that the sound shield occupies. In addition, the box 712 includes a handle 716, which allows the box 712 to be easily transported. The box 712 may also include any fasteners or other parts associated with assembling the sound shield enclosure 700. As seen in FIG. 16, after the sound shield enclosure 700 has been packaged in the box 712, the box 712 may be placed inside a crate 718 along with the genset 712 for shipping. Alternatively, the box 712 may be shipped to the boat builder separate from the genset.

A boat builder or user may perform one or more operations with the genset or genset assembly 12. Operations include installation of the genset 12 fuel priming the genset 12, testing the genset 12, unpacking the genset 12 and/or pieces 702, 704, 706, 708, 710, and use of the genset 12. Other operations are contemplated. Furthermore, a builder or user may assemble the pieces or panels 702, 704, 706, 708, 710 about the genset or genset assembly 12. The assembly of the sound shield 700 may be performed after an operation with the genset 12 has been performed. In addition, a tool, such as priming tool 500, may be packaged and shipped with the box 712 or crate 718.

Instructions 720 may be provided to the user or builder, which instruct the user how to perform the operations or assemble the sound shield 700. The instructions 720 may be provided by a genset manufacturer or any other appropriate person. In one embodiment, the instructions 720 are provided verbally. In another embodiment, the instructions 720 are provided in written form, including electronically, such as an owner's manual or computer file like a PDF, to name a few examples.

Figure 17:
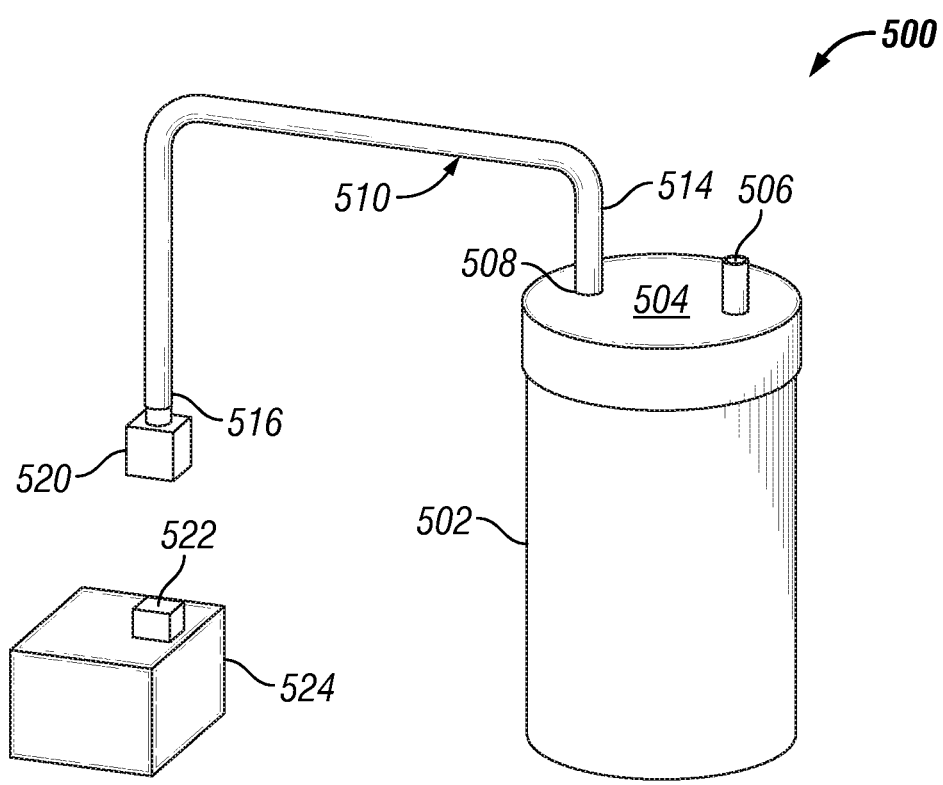
FIG. 17 is a perspective view of a priming tool.
Figure 19:
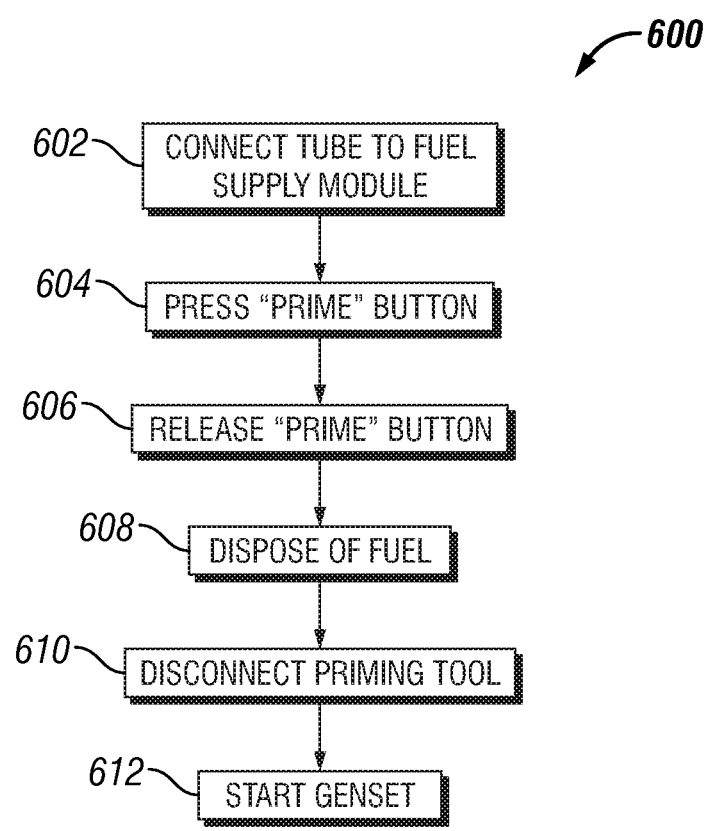
FIG. 19 is a schematic flow diagram of a procedure for using a priming tool.

FIGS. 17-19 illustrate a fuel system priming tool 500. In one embodiment, a gasoline genset has an electronic fuel injection system with a fuel supply module. In a gasoline marine genset, the gasoline fuel system can not be vented to the atmosphere due to the risk of a gasoline leak in the boat. However, the fuel supply module and the injector must be purged of air or primed before the engine will start in certain circumstances such as after servicing the fuel filter or fuel pump, when the genset has run out of fuel, or when a new genset is first connected to the vessel's fuel tank that has not already been primed. Opening a vent on the fuel system creates a potential safety risk, as gasoline may spray out or leak into the boat. If the operator catches the fuel in a container or rag there is a risk that the fuel may not be disposed of properly. Thus, venting a new gasoline genset can pose a problem for boat builders and other operators. In one embodiment, the fuel supply module has a valve. A priming tool connects to the valve, and the operator uses an electric fuel transfer pump to pump fuel into the system. Air vents to the tool and into the atmosphere via a vent. When gasoline enters the tool, the operator stops priming. The fuel can be easily returned to the fuel tank because it is in a clean bottle with a removable lid.

FIGS. 17 and 18 show an exemplary form of priming tool 500. The priming tool 500 includes a housing 502 in the form of a cylindrical container, but other shapes are contemplated. Furthermore, the housing 502 may be a fuel-rated, plastic translucent bottle. In one embodiment, at least a portion of the housing is transparent or translucent. The housing 502 is configured to retain approximately 400-500 mL of fuel. The priming tool 500 further includes a cap 504 that engages the housing 502 by any fastening means including the cap 504 screwing onto the housing 502. The cap 502 includes a vent 506 that allows air from the housing 502 to vent into the atmosphere. The cap 504 includes an aperture 508 which is coupled to a tube 510. In one embodiment, the tube 510 is an SAE J30 R12 5/16" hose. The tube 510 may also include clamps 512 such as Oetiker clamps. The tube 510 has a proximate end 514 coupled to the aperture 508 and a distal end 516 that has a valve connecting means 520 such as a female end of a Schrader valve. The valve connecting means 520 is connected to a valve 522 on a fuel supply module 524. The housing 502 also has a fill line 526 indicating how much fuel may be safely filled into the housing 502. In one embodiment, the tube 510 is flexible.

In another embodiment, the housing 502 has a diameter of approximately 70 mm, a height of approximately 130 mm, and the line 526 is located approximately 10 mm from the bottom of the housing 502. Furthermore, in one embodiment, the vent 506 and aperture 508 have diameters between approximately 6-8 mm. Further still, in one embodiment, the tube 510 is approximately 200 mm in length and the valve connecting means is approximately 10 mm in length.

FIG. 19 is a flowchart for an operating procedure 600 for priming a genset using the priming tool 500. In operation 602, the tube 510 of the priming tool 500 is connected to the valve 522 on the genset's fuel supply module 524 via the valve connection means 520. In operation 604, the operator presses the "Prime" button or a similar button on the genset 12. The genset fuel transfer pump then draws fuel from the tank and pumps air and fuel to the fuel supply module 524. Air flows from the fuel supply module 524 into the priming tool 500 and then into the atmosphere. In operation 606, the operator releases the "Prime" button or a similar button when fuel reaches the line 526 near the bottom of the priming tool 500. In operation 608, the operator disposes of the fuel in the priming tool 500. In operation 610, the operator disconnects the priming tool 500 from the genset 12. It is contemplated that operation 610 could be performed before operation 608. In operation 612, the operator starts the genset 12.

The priming tool 500 provides several advantages including allowing an operator to prime the genset and fuel system for best performance with a previously drained system. The priming tool 500 also allows air trapped in the system to be removed safely, reduces the amount of fuel waste, and controls pressurized fuel to protect the operator.

Figure 21:
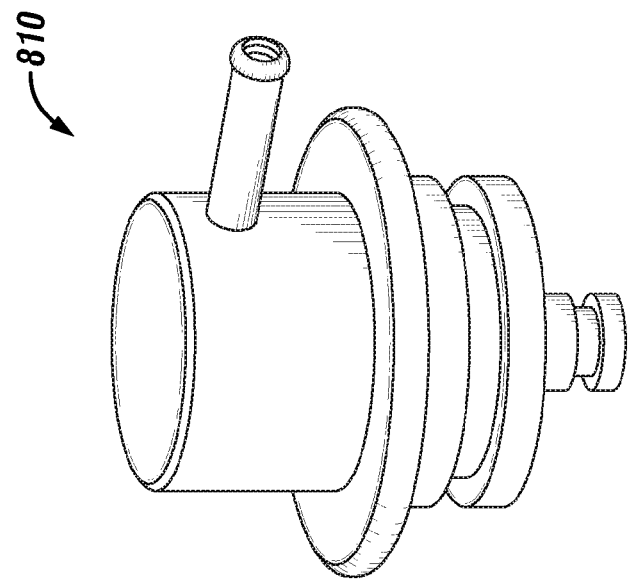
FIG. 21 is a perspective view of a fuel supply module.
Figure 20:
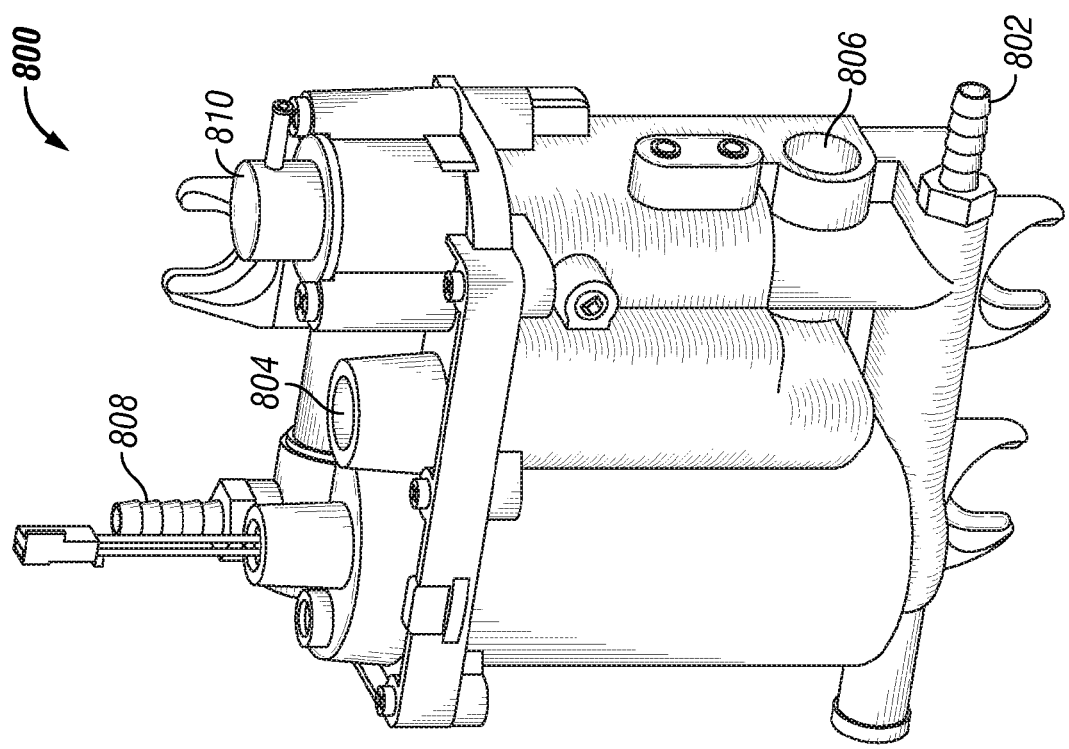
FIG. 20 is a perspective view of a fuel supply module.

FIGS. 20 and 21 illustrate a fuel supply module 800. The fuel supply module includes a fuel inlet 802, a cooling water outlet 804, a cooling water inlet 806, a fuel outlet 808, and an external regulator 810. The external regular 810 set point is 250+/−10 kPa. In addition, the regulator 810 is vented to the intake system. In the event of a diaphragm failure, the engine shuts down, and there is no leak of gasoline in the boat.

Figure 26:
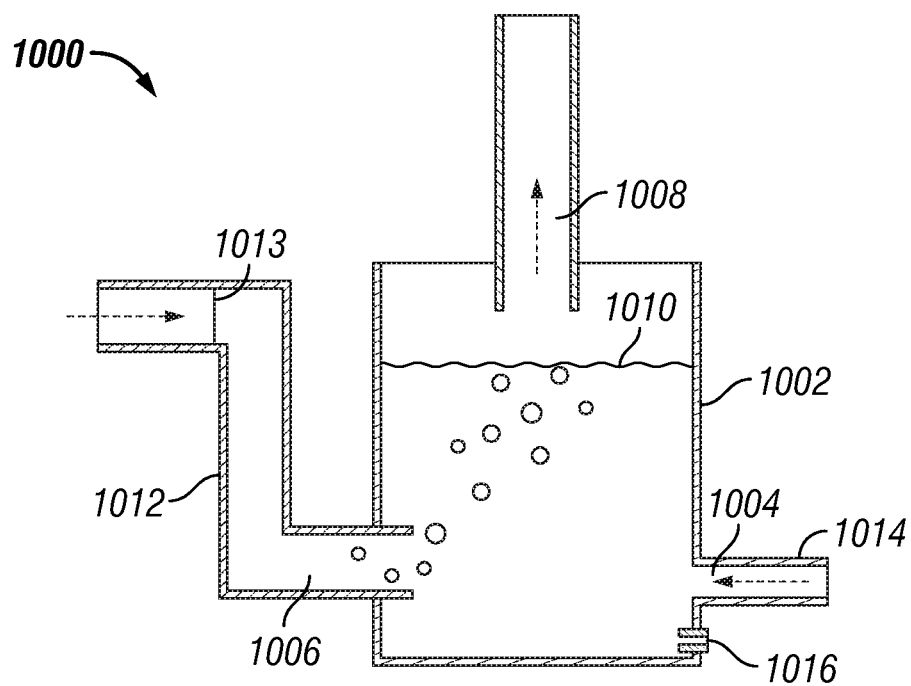
FIG. 26 is a cross-section view of an exhaust injection muffler.

FIGS. 22-25 and 27 illustrate another embodiment of the system 10 including a genset 12 in a watercraft 13. An exhaust cooler 900 is located downstream of the catalyst assembly 40 and is in fluid communication with the catalyst assembly 40 to receive exhaust from the assembly 40. An exhaust injection muffler 1000 is coupled to the exhaust cooler 900 to receive exhaust and to receive a coolant from the exhaust cooler 900 as seen in FIG. 22. Alternatively, dry muffler 1100 may be coupled to the exhaust cooler 900 as seen in FIG. 26.

Figure 24:
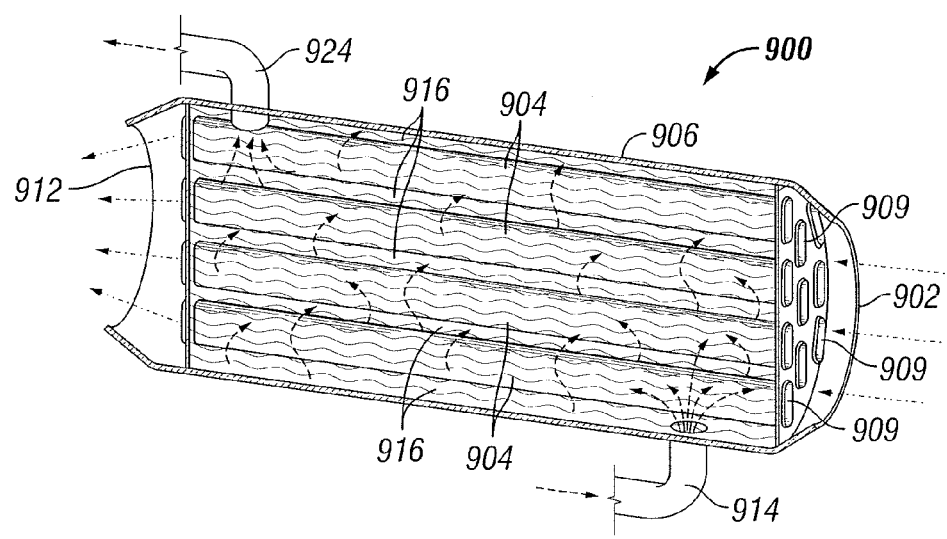
FIG. 24 is a section view of an exhaust cooler.
Figure 25:
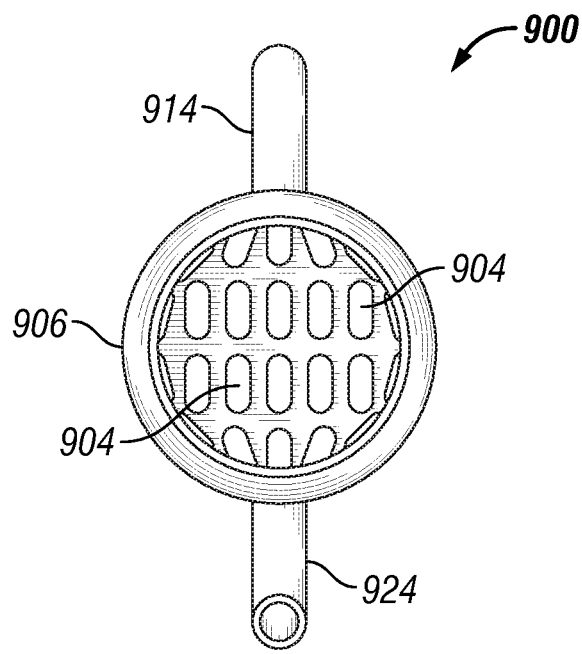
FIG. 25 is an elevation view of an exhaust cooler.

The exhaust cooler 900 includes an inlet port 902 for receiving exhaust from the catalyst assembly 40. The exhaust cooler 900 includes one or more exhaust passageways 904 and a housing 906. The passageways 904 are generally conduits that allow exhaust to flow through the exhaust cooler 900 from the inlet port 902 to an outlet port 912. On either end of the exhaust cooler 900 are openings 909 for the passageways 904 that allow exhaust to enter and exit the passageways 904. It is contemplated that the exhaust passageways 904 may be generally straight (as shown in FIG. 24) or serpentine (not shown).

In one embodiment, the exhaust flows from the outlet port 912 to the exhaust injection muffler 1000. In other embodiments the exhaust may flow out of the watercraft 13 or into other components or mufflers such as muffler 1100. The housing 906 may be made of a metal such as stainless steel, which may be a cast or a spun stainless steel enclosure, to name a couple of examples.

The exhaust cooler 900 also includes a coolant inlet 914 that allows a coolant to flow into one or more coolant passageways 916 that may be defined by the exhaust passageways 904 and housing 906. The coolant flows around the exhaust passageways 904 to cool the exhaust as the exhaust flows through the exhaust passageways 904. It should be appreciated that in this embodiment, coolant does not mix with the exhaust. The coolant may be taken from the body of water 918 that the watercraft 13 is currently in such as a stream, lake, sea, or ocean. Alternatively, the coolant may be from an engine coolant being cycled throughout one or more components in the system 10. The coolant may be pumped into the exhaust cooler 900 with a pump 921. Coolant exits the annular passage 916 through a coolant outlet 924. In one embodiment, the coolant flows into the exhaust injection muffler 1000. In other embodiments the exhaust may flow out of the watercraft 13 or into other components or mufflers such as muffler 1100.

In one embodiment, the exhaust passageways 904 have fins or other thermal transfer means (not shown) known to those skilled in the art to increase surface area to further cool the exhaust. In another embodiment, the coolant passageways 916 have fins or other thermal transfer means (not shown) known to those skilled in the art to increase surface area to further cool the exhaust. In yet another embodiment, both the exhaust passageways 904 and coolant passageways 916 have fins or thermal transfer means.

FIGS. 22 and 26 illustrate another embodiment of the system 10 including an exhaust injection muffler 1000. The exhaust injection muffler 1000 includes a container 1002 to receive a coolant through a coolant inlet port 1004. The coolant may be from the exhaust cooler 900 as shown in FIG. 22 or may be from a pump, such as pump 921 or any other suitable means known to those of ordinary skill in the art. The exhaust injection muffler 1000 also includes an exhaust inlet port 1006 to receive exhaust from the exhaust cooler 900 or from another component such as the catalyst assembly 40. The temperature of the exhaust is lowered by the coolant in the container 1002. The muffler 1000 may also reduce the noise created by operation of the genset 12 and/or exhaust. The exhaust exits the muffler 1000 through the exhaust outlet port 1008. After exiting the muffler 1000, the exhaust may flow out of the watercraft 13 or to other components as known by those skilled in the art.

Exhaust is injected into the container 1002 from the exhaust inlet port 1006 below the coolant level 1010. Coolant does not flow in a tube 1012 connecting the outlet port 912 on the exhaust cooler 900 and the exhaust inlet 1006, which allows the exhaust to be a "dry" exhaust. A tube 1014 connects the coolant outlet 924 of the exhaust cooler 900 and the coolant inlet port 1004 of the exhaust muffler 1000. The tube 1012 may include a valve 1113 to prevent coolant from flowing upstream towards the exhaust cooler 900, the catalyst assembly 40, or the manifold 30. Generally, the coolant flows into the container 1002 below the coolant level 1010. The exhaust muffler 1000 may also include a drain plug 1016 to drain coolant from the container 1002.

Figure 27:
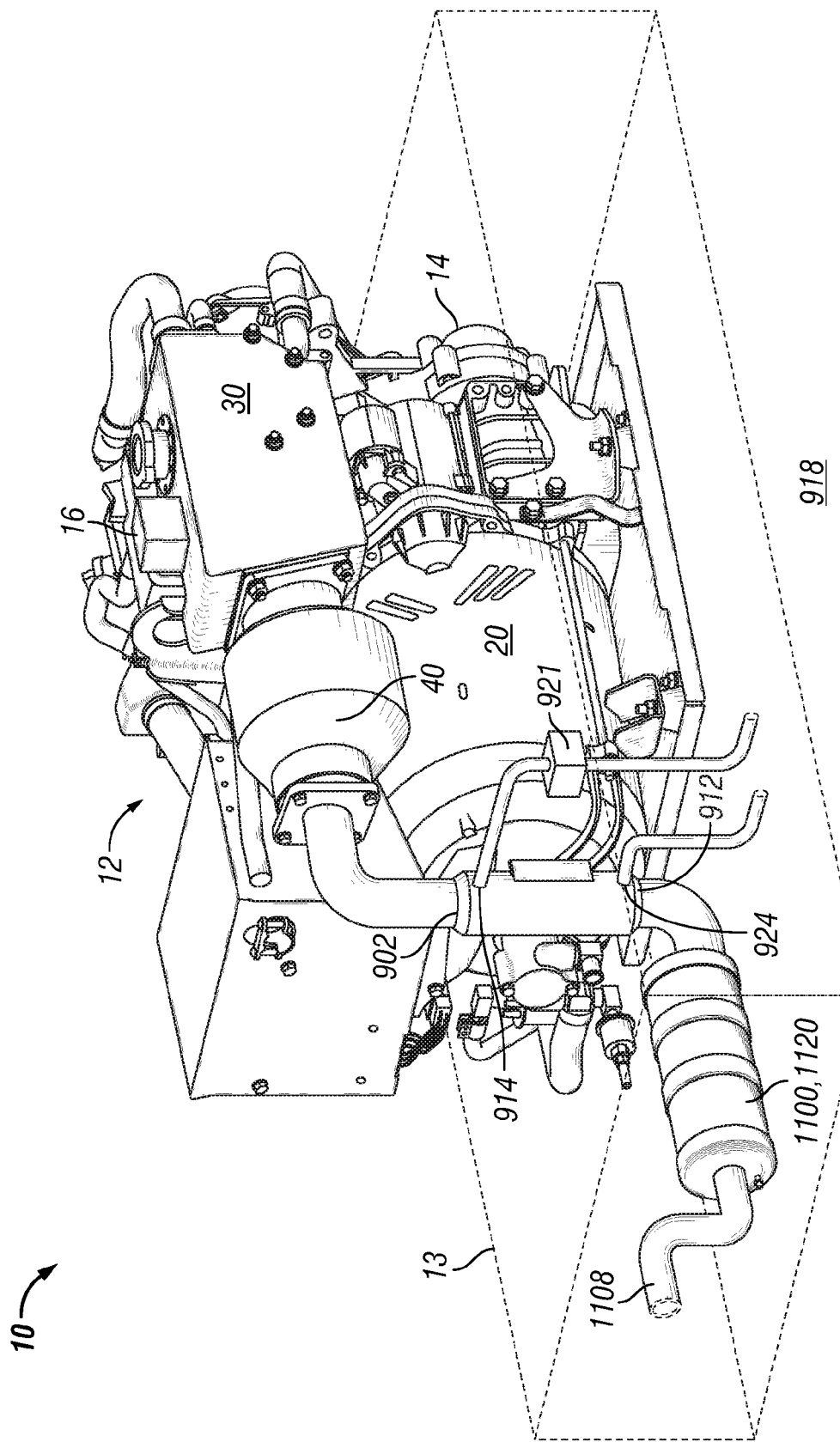
FIG. 27 is a perspective view of a genset in a watercraft.
Figure 28:
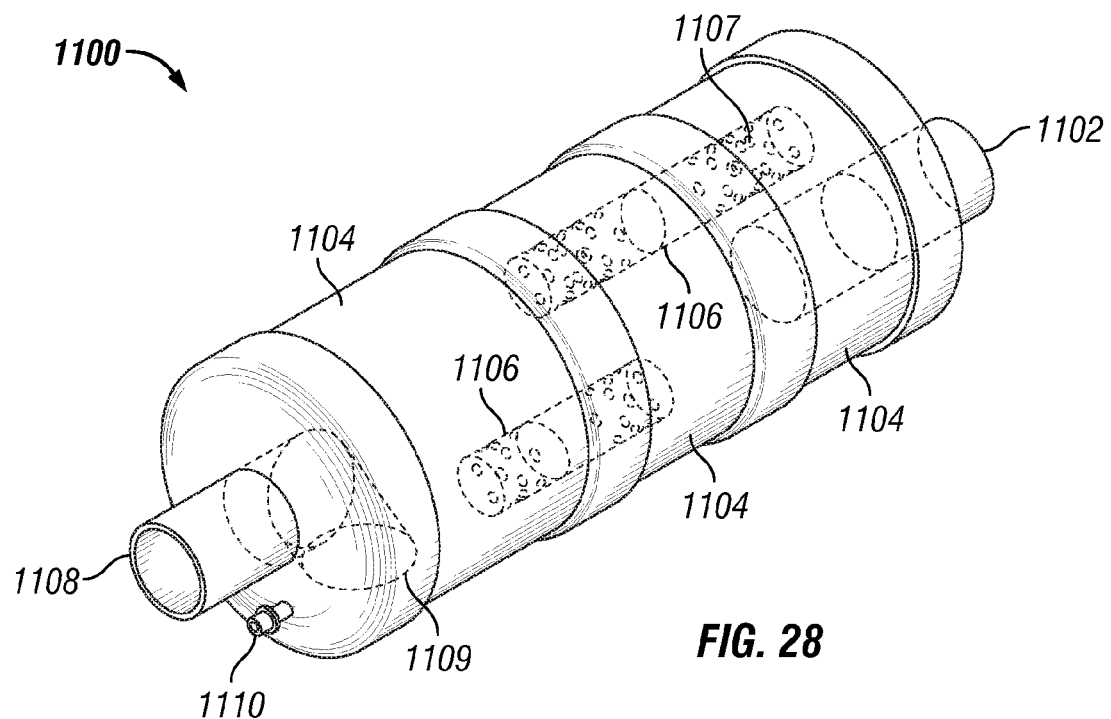
FIG. 28 is a perspective view of a muffler.
Figure 29:
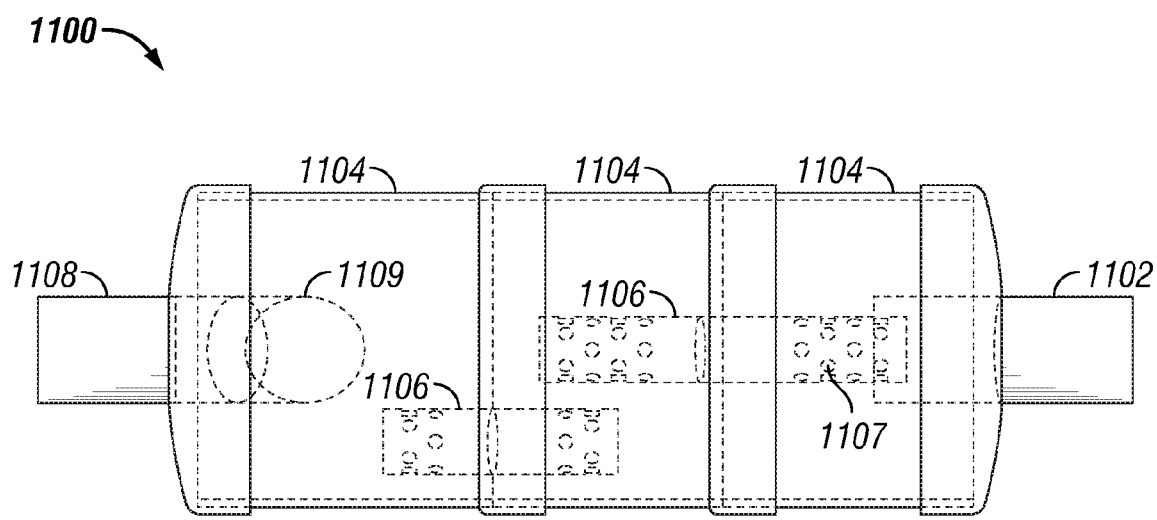
FIG. 29 is an elevation view of the muffler in FIG. 28.

FIGS. 27-29 illustrate a muffler 1100 connected to the exhaust cooler 900. The muffler 1100 has an exhaust inlet port 1102 that receives exhaust from the outlet port 912 on the exhaust cooler 900. The muffler 1100 may also have one or more chambers 1104. Exhaust flows from chamber 1104 to chamber 1104 through one or more baffle tubes 1106. In addition, the baffle tubes 1106 may have holes 1107 in them to allow the exhaust to flow through holes and swirl and mix in the chambers 1104.

After the exhaust flows through the one or more chambers 1104, the exhaust exits the muffler 1100 through an outlet 1108. The exhaust may then exit the watercraft 13. In one embodiment, the outlet 1108 includes a tube 1109 inside the muffler 1100 that is transverse to a longitudinal axis of the muffler 1100. As the exhaust flows through the muffler 1100, noise created by the genset 12 and exhaust is muffled or reduced. The muffler 1100 may also include a drain plug 1110 to drain any liquid that may form from the exhaust.

Figure 30:
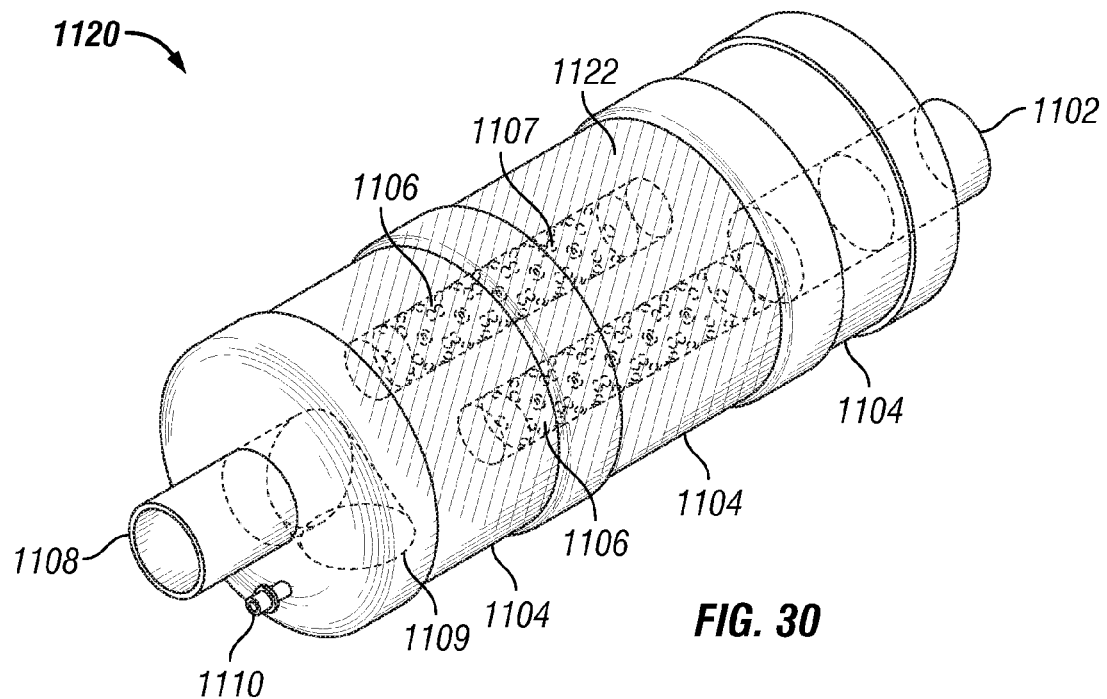
FIG. 30 is a perspective view of a muffler.
Figure 31:
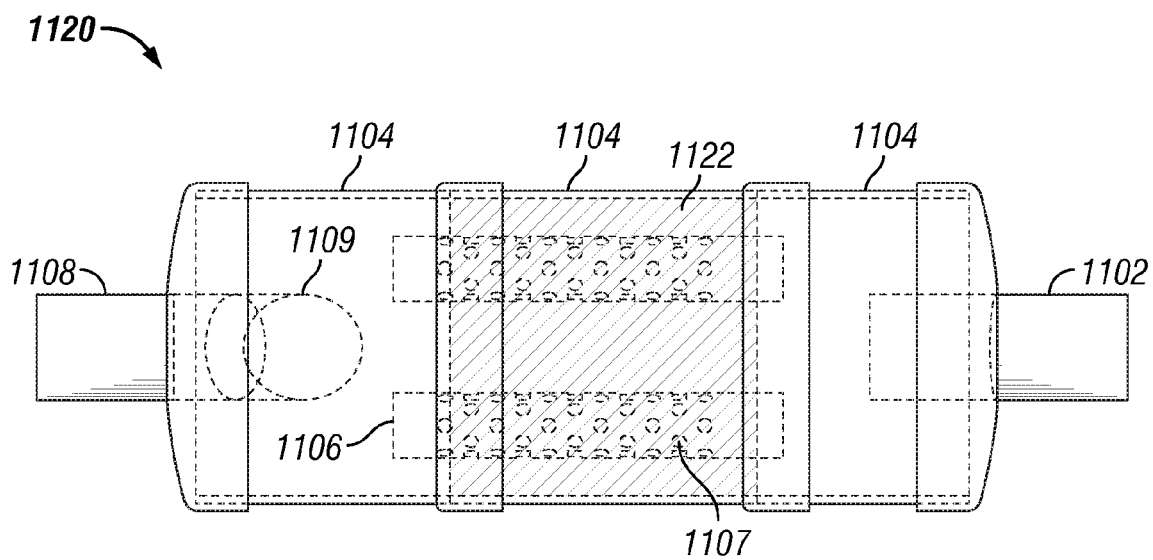
FIG. 31 is an elevation view of the muffler in FIG. 30.

FIGS. 27, 30, and 31 illustrate another embodiment of a muffler 1120. The muffler 1120 includes several of the same components as muffler 1100 and shares like reference numbers. In the one or more chambers 1104 of muffler 1120, metallic filaments 1122 to further reduce noise created by the genset 12 or exhaust. In one embodiment, the metallic filaments 1122 are steel wool. It is contemplated that other similar materials known to those skilled in the art may be used.

It should be appreciated that the neither muffler 1100 nor muffler 1120 receive any coolant from the exhaust cooler 900.

Figure 32:
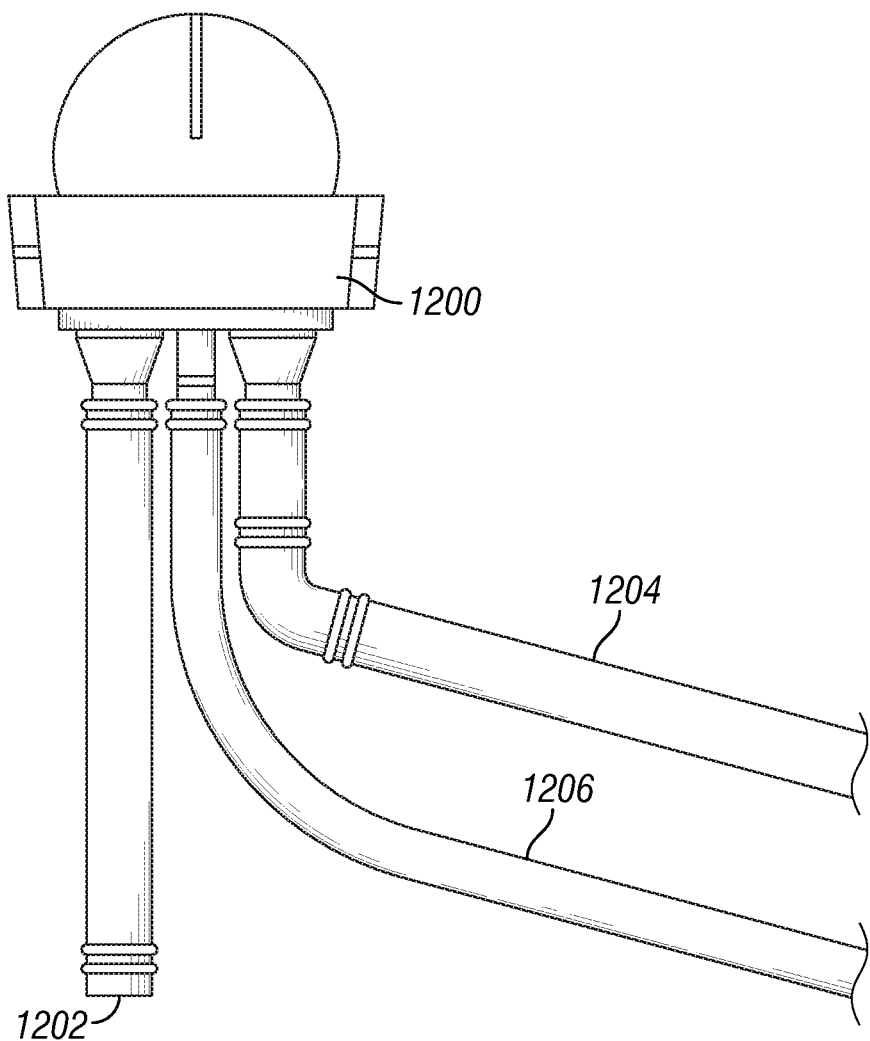
FIG. 32 is an elevation view of a water separator.

FIG. 32 illustrates a water separator 1200. The water separator 1200 includes an inlet 1202 connected to the outlet port 912 of the exhaust cooler 900 or the outlet port 1008 of the exhaust injection muffler 1000 to receive an exhaust gas stream. The water separator 1200 receives the exhaust gas stream and separates a liquid, such as water, from the exhaust gases. After the liquid has been separated, the exhaust gases flow out of the water separator 1200 through an exhaust outlet 1204. The liquid exits the water separator 1200 through the liquid outlet 1206. It is contemplated that the water separator 1200 may be connected to other components or mufflers.

Many further embodiments are envisioned. For example, in one embodiment, the engine is fueled with diesel or other fuel or fuels as would occur to those skilled in the art. In another embodiment, an apparatus comprises: an internal combustion engine; an electric power generator coupled to the engine; an exhaust manifold for the engine including an exhaust gas conduit; and a housing having a catalyst in fluid communication with the conduit to receive exhaust therefrom, the housing having insulation to reduce outer temperature of the housing while maintaining a desired temperature of the catalyst during operation of the engine; and a discharge passage to discharge exhaust from the catalyst with an inlet to mix coolant therewith.

Other features may include a mixer in fluid communication with the catalyst, the mixer including an annular passage for the coolant and at least partially defining the discharge passage; that the manifold includes a sensor; the sensor is adapted to monitor oxygen in an exhaust gas stream; a first sensor located upstream of the catalyst; a second sensor located downstream of the catalyst; that the first sensor and the second sensor are adapted to monitor oxygen in an exhaust gas stream; means for mixing the coolant in the form of water with exhaust discharged from the catalyst; that the catalyst is operable to reduce CO in an exhaust gas stream; that the generator is of a variable speed type; and that the generator is of a fixed speed type.

In another embodiment, an apparatus includes an internal combustion engine; an electric power generator coupled to the engine; the engine defining an exhaust gas flow path in an axial direction; a cavity generally transverse to the exhaust gas flow path that is operable to receive a sensor; and a passage that is operable to receive a coolant that transfers heat from the exhaust gas flow path.

Other features may include a catalyst assembly to receive exhaust from the exhaust gas flow path, the catalyst assembly including a catalytic substance structured to reduce CO content of the exhaust; insulation about the catalyst assembly to increase catalyst temperature while maintaining an outer temperature below a desired level; that the generator is of a variable speed type; that the generator is of a fixed speed type; means for providing the coolant in the form of water from an ocean or a lake; that the cavity and the passage are not in fluid communication with each other; a flange configured to engage a HET switch; a flared and serrated nozzle operable to mix exhaust gases and the coolant.

In yet another embodiment an apparatus includes an internal combustion engine; an electric power generator coupled to the engine; a first sensor operable to transmit a first signal representative of a first exhaust gas constituent upstream of a catalyst; a second sensor operable to transmit a second signal representative of a second exhaust gas constituent downstream of the catalyst; a controller operable to receive the first and second signals and execute operating logic in response thereto; and a discharge passage to discharge exhaust from the catalyst with an inlet to mix coolant therewith.

Other features of the apparatus may include that the first and second sensors are oxygen sensors; that the controller is operable to adjust a fuel-to-air ratio based on the first signal; and that the operating logic is structured to determine an efficiency of the catalyst and shut down the genset when catalyst efficiency deteriorates in relation to a predefined level.

In another embodiment, a method comprises: monitoring a first signal representative of oxygen concentration upstream of a catalyst and a second signal representative of oxygen concentration downstream of the catalyst; evaluating the first and second signals; and controlling a genset based on the evaluating of the first and second signals.

Other features may include illuminating a warning light based the evaluating of the first and second signals; turning off the genset based on the evaluating of the first and second signals; and adjusting an air-to-fuel ratio based on at least one of the evaluating of the first and second signals.

In another embodiment, an apparatus includes an intake having a filter, the intake operable to draw in air, the filter operable to filter the air; a valve coupled to the intake; and a tube having a proximate end coupled to the valve and a distal end coupled to an exhaust gas conduit.

Other features of the embodiment may include an engine having a manifold, wherein the exhaust gas conduit is located in the manifold; that the distal end is coupled to the exhaust gas conduit upstream of a catalyst; a variable speed genset; and a fixed speed genset.

In yet another embodiment, a kit for a genset including a sound shield includes a plurality of sound shield pieces that at least partially enclose a genset assembly when assembled together; and a shipping container structured to hold the plurality of sound shield pieces separate from the genset assembly.

Other features of the embodiment may include that the shipping container is structured to be placed inside a further shipping container with the genset; a plurality of protective layers placed between the plurality of sound shield pieces and the genset within the further shipping container; and that the shipping container is a box with a handle and the further shipping container is a crate.

In another embodiment, a method comprises: arranging a plurality of panels for a sound shield; packaging the plurality of panels in a first shipping container; providing a genset assembly to be at least partially enclosed by the sound shield; shipping the first shipping container and the genset assembly to a selected designation; performing an operation with the genset assembly; assembling the panels about the genset assembly after the performing of the operation to at least partially enclose the genset assembly.

Other features of the embodiment may include placing the first shipping container in a second shipping container, the second shipping container being structured to also receive the genset assembly; that the first shipping container is in the form of a box with a handle; that the operation includes at least one of installation, fuel priming, testing, unpacking, and use of the genset assembly; that a tool to prime the genset assembly with fuel; that the tool includes a housing structured to retain fuel; a cap structured to engage the housing, the cap having a first port and a second port, the second port in fluid communication with atmosphere; and a hose having a proximate end and a distal end, the proximate end attached to the first port.

In yet another embodiment, an apparatus comprises a housing structured to retain a fluid; a cap structured to engage the housing, the cap having a first port and a second port, the second port in fluid communication with atmosphere; and a hose having a proximate end and a distal end, the proximate end attached to the first port.

Other features of the embodiment may include the distal end is structured to engage a fuel supply module; that at least a portion of the housing is translucent; that the housing further comprises a fill line; that the cap is structured to screw onto and off of the housing; and a genset having a fuel supply module, wherein the distal end is structured to engage the fuel supply module.

In yet another embodiment, a method includes connecting a tube of a tool to a fuel supply module of a genset; priming a genset fuel passage while the tool is connected; collecting fuel in the tool; disposing of fuel in the tool; and disconnecting the tool from the fuel supply module.

Other features of the embodiment may include that the disconnecting step occurs before the disposing step; that the tool is packaged in a first shipping container with a genset assembly; placing a second shipping container in the first shipping container, the second shipping container containing a plurality of panels to form a sound shield about the genset assembly; and that the second shipping container is in the form of a box.

In another embodiment, an apparatus includes a marine genset including an internal combustion engine and an electric power generator mechanically driven by the engine; an exhaust manifold for the engine including an exhaust gas conduit; and an exhaust emission aftertreatment device including an exhaust passage in fluid communication with the conduit to receive exhaust therefrom, the device including a catalyst in the exhaust passage to reduce one or more exhaust constituents and thermal insulation fixed about the catalyst to reduce an outer temperature of the device while maintaining a desired temperature of the catalyst during operation of the engine, the device being structured without a liquid coolant passageway to reduce temperature thereof.

In yet another embodiment, a method includes operating an internal combustion engine at a speed; driving a electrical power generator with the engine; reducing one or more constituents of an exhaust stream received from the engine with a catalyst; and controlling a temperature of the catalyst with thermal insulation fixed about the catalyst without using a liquid coolant.

Other features of the embodiment may include maintaining an approximately constant speed of the engine during nominal operation; varying the speed; controlling an air-to-fuel ratio of the engine based on an oxygen sensor upstream of the catalyst; and carrying the engine, the generator, and the catalyst in a watercraft.

In another embodiment, an apparatus includes means for generating mechanical power including an internal combustion engine at a speed; means for driving a electrical power generator with the engine; means for reducing a constituent of an exhaust from the engine with a catalyst; and means for controlling temperature of the catalyst with insulation fixed about the catalyst without using a liquid coolant.

In yet another embodiment, an apparatus includes a marine genset including an internal combustion engine and an electric power generator mechanically driven by the engine; an exhaust manifold for the engine including an exhaust gas conduit; an exhaust emission aftertreatment device including a catalyst in fluid communication with the conduit to receive exhaust therefrom, the device having thermal insulation fixed about the catalyst to reduce an outer temperature of the device while maintaining a desired temperature of the catalyst during operation of the engine; and an exhaust cooler to cool the exhaust located downstream of the catalyst.

In another embodiment, an apparatus includes a marine genset including an internal combustion engine and an electric power generator mechanically driven by the engine; an exhaust manifold for the engine including an exhaust gas conduit; and an exhaust emission aftertreatment device including an exhaust passage in fluid communication with the conduit to receive exhaust therefrom, the exhaust emission aftertreatment device including a catalyst in the exhaust passage to reduce one or more exhaust constituents; and an exhaust cooling device including a plurality of exhaust passageways in fluid communication with the exhaust passage to receive exhaust therefrom, the exhaust cooling device further including an coolant conduit to receive a coolant to cool the exhaust, the exhaust passageways being in thermal contact with the coolant conduit.

In yet another embodiment, a method includes operating an internal combustion engine at a speed; driving a electrical power generator with the engine; reducing one or more constituents of an exhaust stream received from the engine with a catalyst; and controlling a temperature of the exhaust stream by flowing coolant around a plurality of exhaust passageways in an exhaust cooling device downstream of the catalyst.

In another embodiment, an apparatus includes means for operating an internal combustion engine at a speed; means for driving a electrical power generator with the engine; means for reducing one or more constituents of an exhaust stream received from the engine with a catalyst; and means for controlling a temperature of the exhaust stream by flowing coolant around a plurality of exhaust passageways in an exhaust cooling device downstream of the catalyst.

In yet another embodiment, an apparatus includes a marine genset including an internal combustion engine and an electric power generator mechanically driven by the engine; an exhaust manifold for the engine including an exhaust gas conduit; and an exhaust emission aftertreatment device including an exhaust passage in fluid communication with the conduit to receive exhaust therefrom, the exhaust emission aftertreatment device including a catalyst in the exhaust passage to reduce one or more exhaust constituents; and an exhaust muffler including a container having a coolant inlet to receive coolant, the container further including an exhaust inlet in fluid communication with the exhaust passage to receive exhaust therefrom, the container further including an exhaust outlet to allow exhaust to flow from the container, wherein exhaust flows into the container below a coolant level.

In another embodiment, a method includes operating an internal combustion engine at a speed; driving a electrical power generator with the engine; reducing one or more constituents of an exhaust stream received from the engine with a catalyst; and muffling noise from the engine and the exhaust stream with an exhaust muffler downstream of the catalyst by injecting a substantially dry exhaust stream into the exhaust muffler, including coolant, below a coolant level.

In yet another embodiment, an apparatus includes means for generating electrical power including an internal combustion engine mechanically driving a electrical power generator; means for reducing one or more constituents of an exhaust stream received from the generating means with a catalyst; and means for muffling noise from the engine and the exhaust stream with an exhaust muffler downstream of the catalyst by injecting a substantially dry exhaust stream into the exhaust muffler, including coolant, below a coolant level.

In another embodiment, a method includes arranging a plurality of panels for a genset enclosure; packaging the plurality of panels in a first shipping container; providing a genset assembly to be at least partially enclosed by the genset enclosure; shipping the first shipping container and the genset assembly to a selected destination; and providing instructions for performing an operation with the genset assembly and for assembling the panels about the genset assembly after the performing of the operation to at least partially enclose the genset assembly.

Other features of the embodiment may include that the genset enclosure is a sound shield; placing the first shipping container in a second shipping container, the second shipping container being structured to also receive the genset assembly; that the first shipping container is in the form of a box with a handle; that the operation includes at least one of installation, fuel priming, testing, unpacking, and use of the genset assembly; packaging a priming tool in the second shipping container with the genset assembly; that the second shipping container is in the form of a crate; that the genset assembly is a marine genset assembly; that the instructions are included in one of the first shipping container and the second shipping container; and that the instructions are verbal instructions.

In yet another embodiment, a kit for a genset including a genset enclosure may include a plurality of genset enclosure pieces to at least partially enclose a genset assembly when assembled together; and a shipping container structured to hold the plurality of sound shield pieces separate from the genset assembly.

Other features of the embodiment may include that the genset enclosure pieces are sound shield pieces; that the shipping container is structured to be placed inside a further shipping container with the genset; a plurality of protective layers placed between the plurality of genset enclosure pieces and the genset within the further shipping container; that the shipping container is a box with a handle and the further shipping container is a crate; instructions for assembling the genset enclosure pieces.

In another embodiment, a method includes arranging a plurality of panels for a sound shield; packaging the plurality of panels in a first shipping container; placing a genset assembly and the first shipping container in a second shipping container; and shipping the second shipping container to a selected destination, wherein the genset assembly is a marine genset assembly.

Other features of the embodiment may include instructing a user how to perform an operation with the genset assembly and how to assemble the panels about the genset assembly after the performing of the operation; placing the first shipping container in a second shipping container, the second shipping container being structured to also receive the genset assembly; that the instructing is in the form of one of verbal instructions and written instructions.

While the invention has been illustrated and described in detail in the drawings and foregoing description, the same is to be considered as illustrative and not restrictive in character, it being understood that only the preferred embodiments have been shown and described and that all changes and modifications that come within the spirit of the inventions are desired to be protected. It should be understood that while the use of words such as preferable, preferably, preferred or more preferred utilized in the description above indicate that the feature so described may be more desirable, it nonetheless may not be necessary and embodiments lacking the same may be contemplated as within the scope of the invention, the scope being defined by the claims that follow. In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

What is claimed is:

1. An apparatus, comprising:
    a marine genset including an internal combustion engine and an electric power generator mechanically driven by the engine;
    an exhaust manifold for the engine including an exhaust gas conduit; and
    an exhaust emission aftertreatment device including an exhaust passage in fluid communication with the exhaust gas conduit to receive exhaust therefrom, the exhaust emission aftertreatment device including a catalyst in the exhaust passage to reduce one or more exhaust constituents and thermal insulation fixed about the catalyst to reduce an outer temperature of the exhaust emission aftertreatment device while maintaining a desired temperature of the catalyst during operation of the engine, the exhaust emission aftertreatment device being structured without a liquid coolant passageway to reduce temperature thereof.

2. The apparatus of claim 1, wherein the catalyst is a three-way catalyst.

3. The apparatus of claim 1, wherein the catalyst is structured to reduce carbon monoxide in the exhaust.

4. The apparatus of claim 1, wherein the exhaust emission aftertreatment device includes an elongated tube defining the exhaust passage receiving the catalyst, the tube being in fluid communication with the exhaust gas conduit of the exhaust manifold, the exhaust emission aftertreatment device further including a housing
    extending from the exhaust manifold around the tube, and the thermal insulation extends between the tube and the housingcatalyst includes means for reducing carbon monoxide content of the exhaust.

5. The apparatus of claim 1, further comprising: a first sensor located upstream of the catalyst; and
    a second sensor located downstream of the catalyst.

6. The apparatus of claim 5, wherein the first sensor and the second sensor are configured to provide a first signal and a second signal, respectively, corresponding to an oxygen amount in the exhaust, and further comprising a controller configured to determine a plurality of test mode conditions of operation are satisfied in order to evaluate an efficiency of the catalyst in response to the first and second signals adapted to monitor oxygen in an exhaust gas stream.

7. The apparatus of claim 1, further comprising an exhaust cooler located downstream of the catalyst.

8. The apparatus of claim 1, further comprising:
    a watercraft carrying the genset, the manifold, and the exhaust emission aftertreatment device.

9. The apparatus of claim 1, further comprising an exhaust muffler located downstream of the catalyst.

10. A method, comprising:
    operating an internal combustion engine of a marine genset at engine speed;
    driving an electrical power generator of the marine genset with the engine;
    passing exhaust from the engine through an exhaust gas conduit of an exhaust manifold;
    passing the exhaust from the exhaust gas conduit through an exhaust passage of an exhaust emission aftertreatment device, the exhaust emission aftertreatment device including a catalyst in the exhaust passage;

using the catalyst to reduce one or more constituents of the exhaust received from the engine; and controlling a temperature of the catalyst with thermal insulation fixed about the catalyst, and reducing an outer temperature of the exhaust emission aftertreatment device, without using a liquid coolant, during operation of the internal combustion engine.

11. The method of claim 10, which includes maintaining an approximately constant speed of the engine during nominal operation.

12. The method of claim 10, which includes varying the speed.

13. The method of claim 10, further comprising controlling an air-to-fuel ratio of the engine based on an oxygen sensor upstream of the catalyst.

14. The method of claim 10, wherein the exhaust emission aftertreatment device includes an elongated tube defining the exhaust passage receiving the exhaust, the exhaust emission aftertreatment device further including a housing extending around the tube, and the thermal insulation extends between the tube and the housing.

15. The method of claim 10, which includes cooling the exhaust with an exhaust cooler located downstream of the catalyst.

16. The method of claim 15, further comprising providing the exhaust from the exhaust cooler to an exhaust muffler downstream of the catalyst.

17. An apparatus, comprising:
an internal combustion engine configured to generate means for generating mechanical power including an internal combustion engine at a speed;
means for driving a an electrical power generator connected with the engine configured to convert the mechanical power to electrical power;
an exhaust gas system connected to the engine to receive means for reducing a constituent of an exhaust from the engine, the exhaust gas system including an elongated tube defining an exhaust passage with a catalyst configured to reduce a constituent in the exhaust and a housing extending around the elongated tube; and
means for controlling temperature of the catalyst with insulation fixed about the catalyst between the tube and the housing that is configured to control a temperature of the catalyst without using a liquid coolant.

18. The apparatus of claim 17, further comprising controller configured to control means for controlling an air-to-fuel ratio of the engine based on a signal from an oxygen sensor upstream of the catalyst.

19. The apparatus of claim 18, further comprising means for cooling and muffling noise downstream of the catalyst a second oxygen configured to provide a second signal in response to oxygen in the exhaust downstream of the catalyst, wherein the controller is configured to determine a plurality of test mode conditions of operation are satisfied before monitoring an efficiency of the catalyst based on a comparison of the oxygen sensor signals.

20. An apparatus, comprising:
a marine genset including an internal combustion engine and an electric power generator mechanically driven by the engine;
an exhaust manifold for the engine including an exhaust gas conduit;
an exhaust emission aftertreatment device extending from an inlet port at the exhaust manifold to an outlet port, the exhaust emission aftertreatment device including a catalyst spaced from the inlet and outlet ports in fluid communication with the exhaust
conduit to receive exhaust therefrom, the exhaust emission aftertreatment device having thermal insulation extending from the inlet port to the outlet port that is fixed about the catalyst to reduce an outer temperature of the exhaust emission aftertreatment device while maintaining a desired temperature of the catalyst during operation of the engine; and
an exhaust cooler to cool the exhaust located downstream of the catalyst.

21. The apparatus of claim 20, further comprising a muffler means for muffling noise downstream of the exhaust cooler.

22. The apparatus of claim 20, wherein the insulation extends between a tube defining an exhaust passage in which the catalyst is positioned and a housing extending along the tube, and the insulation completely surrounds the catalyst.

23. The apparatus of claim 21, further comprising a watercraft to carry the genset, the manifold, device, and the muffler muffling means.

24. The apparatus of claim 20, further comprising a first oxygen sensor configured to provide a first signal in response to oxygen in the exhaust upstream of the catalyst;
a second oxygen sensor configured to provide a second signal in response to oxygen in the exhaust downstream of the catalyst; and
a controller configured to determine a plurality of test mode conditions of operation are satisfied before means for monitoring efficiency of the catalyst based on a comparison of the first and second signals.

* * * * *